United States Patent
Moritz et al.

(10) Patent No.: US 10,291,091 B2
(45) Date of Patent: May 14, 2019

(54) ELECTRIC FLUID PUMP WITH IMPROVED ROTOR UNIT, ROTOR UNIT THEREFOR AND METHODS OF CONSTRUCTION THEREOF

(71) Applicant: MAGNA POWERTRAIN, INC., Concord (CA)

(72) Inventors: David A. Moritz, Port Stanley (CA); Nicholas J. Glowacki, Belmont (CA); Richard Muizelaar, Mississauga (CA)

(73) Assignee: MAGNA POWERTRAIN FPC LIMITED PARTNERSHIP, Aurora (CA)

( * ) Notice: Subject to any disclaimer, the term of this patent is extended or adjusted under 35 U.S.C. 154(b) by 207 days.

(21) Appl. No.: 14/844,564

(22) Filed: Sep. 3, 2015

(65) Prior Publication Data

US 2016/0094099 A1     Mar. 31, 2016

Related U.S. Application Data

(60) Provisional application No. 62/055,034, filed on Sep. 25, 2014.

(51) Int. Cl.
    *H02K 1/27*      (2006.01)
    *H02K 15/03*      (2006.01)
     (Continued)

(52) U.S. Cl.
CPC ............. *H02K 1/30* (2013.01); *F04D 13/064* (2013.01); *F04D 29/2222* (2013.01); *F04D 29/628* (2013.01); *H02K 1/274* (2013.01); *H02K 1/278* (2013.01); *H02K 5/128* (2013.01); *H02K 5/225* (2013.01); *H02K 7/14* (2013.01); *H02K 11/33* (2016.01); *H02K 15/03* (2013.01); *H02K 21/16* (2013.01); *F05D 2230/232* (2013.01);
(Continued)

(58) Field of Classification Search
CPC ........... H02K 1/30; H02K 1/274; H02K 15/03
USPC ................................ 310/156.08, 156.23, 71
IPC ...................................... H02K 1/27,1/30, 15/03
See application file for complete search history.

(56) References Cited

U.S. PATENT DOCUMENTS

| 5,538,395 A | 7/1996 | Hager |
|---|---|---|
| 5,960,543 A | 10/1999 | Moon |

(Continued)

FOREIGN PATENT DOCUMENTS

| CN | 203589985 U | 5/2014 |
|---|---|---|
| EP | 1788690 A1 | 5/2007 |
| JP | 2004-129369 A | 4/2004 |

OTHER PUBLICATIONS

Extended European Search Report dated Feb. 8, 2016 in corresponding European Patent Application No. 15186231.5.

(Continued)

*Primary Examiner* — John K Kim
(74) *Attorney, Agent, or Firm* — Dickinson Wright PLLC

(57) ABSTRACT

An electric fluid pump, rotor unit therefore, and methods of constructions thereof are provided. The fluid pump includes a stator unit configured to generate a magnetic field in response to a control signal. A rotor unit is received within the stator unit, wherein the rotor unit is configured to rotate about a central rotor axis in response to the magnetic field generated by the stator unit. The rotor unit includes a plurality of magnets contained in through openings of a (Continued)

carrier assembly having first and second carrier members, wherein the first and second carrier members are fixed to one another by bond joints.

18 Claims, 17 Drawing Sheets

(51) Int. Cl.
*H02K 1/30* (2006.01)
*F04D 13/06* (2006.01)
*F04D 29/22* (2006.01)
*F04D 29/62* (2006.01)
*H02K 21/16* (2006.01)
*H02K 5/128* (2006.01)
*H02K 5/22* (2006.01)
*H02K 7/14* (2006.01)
*H02K 11/33* (2016.01)
*H02K 1/14* (2006.01)

(52) U.S. Cl.
CPC .......... *F05D 2260/36* (2013.01); *H02K 1/146* (2013.01); *H02K 2211/03* (2013.01)

(56) References Cited

U.S. PATENT DOCUMENTS

| | | | |
|---|---|---|---|
| 6,604,917 B2 | 8/2003 | Casper et al. | |
| 6,935,839 B2 | 8/2005 | Pascoe | |
| 7,548,006 B2 * | 6/2009 | Yu | H02K 1/17 310/156.12 |
| 7,612,478 B2 * | 11/2009 | Marioni | H02K 1/278 310/156.23 |
| 8,562,314 B2 | 10/2013 | Hong et al. | |
| 8,632,321 B2 | 1/2014 | Hadar et al. | |
| 8,747,082 B2 | 6/2014 | Yi et al. | |
| 8,779,638 B2 * | 7/2014 | Burton | H02K 1/2753 29/596 |
| 9,071,107 B2 * | 6/2015 | Haga | H02K 1/278 |
| 9,360,015 B2 * | 6/2016 | Muizelaar | F04D 13/0606 |
| 2007/0114867 A1 * | 5/2007 | Marioni | H02K 1/278 310/156.23 |
| 2007/0138891 A1 * | 6/2007 | Hurst | H02K 1/278 310/156.28 |
| 2008/0169719 A1 * | 7/2008 | Yu | H02K 1/17 310/156.08 |
| 2008/0226474 A1 | 9/2008 | Yoshida et al. | |
| 2008/0278018 A1 * | 11/2008 | Achor | F02M 37/08 310/156.12 |
| 2009/0309448 A1 * | 12/2009 | Yang | H02K 1/2773 310/156.22 |
| 2011/0033320 A1 | 2/2011 | Heier et al. | |
| 2013/0039784 A1 | 2/2013 | Teubel et al. | |
| 2013/0099609 A1 * | 4/2013 | Ikeno | H02K 29/08 310/52 |
| 2013/0257184 A1 * | 10/2013 | Haga | H02K 1/278 310/43 |
| 2013/0257212 A1 * | 10/2013 | Marvin | H02K 1/276 310/156.23 |
| 2013/0259720 A1 * | 10/2013 | Mills | F04D 29/5806 417/410.1 |
| 2014/0017073 A1 | 1/2014 | Muizelaar et al. | |
| 2014/0042858 A1 * | 2/2014 | Tsuchiya | H02K 1/28 310/156.22 |
| 2014/0050602 A1 | 2/2014 | Muizelaar et al. | |
| 2014/0111052 A1 * | 4/2014 | Wu | H02K 1/2766 310/156.28 |
| 2014/0191608 A1 * | 7/2014 | Jang | H02K 1/2773 310/156.22 |
| 2016/0094099 A1 * | 3/2016 | Moritz | H02K 1/274 310/156.08 |

OTHER PUBLICATIONS

Search Reported dated Jul. 25, 2018 in corresponding Chinese Patent Application No. 201510607511.4 (with English translation).

* cited by examiner

ELECTRIC FLUID PUMP WITH IMPROVED ROTOR UNIT, ROTOR UNIT THEREFOR AND METHODS OF CONSTRUCTION THEREOF

CROSS-REFERENCE TO RELATED APPLICATION

This application claims the benefit of U.S. Provisional Application Ser. No. 62/055,034, filed Sep. 25, 2014, which is incorporated herein by reference in its entirety.

BACKGROUND OF THE INVENTION

1. Field of the Invention

The present disclosure relates generally to electric fluid pumps of the type used in motor vehicles, and more particularly to an electric fluid pump having a rotor unit with a magnet carrier assembly including a pair of coaxial components fixed together and a method of constructing the rotor unit.

2. Related Art

This section provides background information related to the present disclosure which is not necessarily prior art.

As is well known, a water pump circulates a liquid coolant through a vehicle's coolant system to transfer heat from the engine for optimized engine performance as well as for use in heating the passenger cabin. Water pumps are largely divided into two classifications including mechanical water pumps and electric water pumps. Mechanical water pumps are typically driven by the engine via an accessory drive system (i.e. pulley and belt system). As such, the flow rate characteristics of mechanical water pumps are primarily dependent on the engine speed. To provide variable control of the flow rate independent of the engine speed, the coolant system is equipped with an electric water pump. The electric water pump typically includes an impeller driven by a variable-speed electric motor controlled by a control apparatus or system. As the number of vehicles equipped with an electric water pump continues to increase, a need exists to develop electrically-operated pump components that can provide enhanced performance and durability.

In many conventional electric water pumps, the rotor unit includes a "molded" magnet carrier within which a plurality of magnets are completely encapsulated. One example of an over-molded magnetic carrier in a rotor of an electric water pump is disclosed in U.S. Pat. No. 8,747,082. However, the process of over-molding the magnets within the plastic carrier is complicated by various characteristic including, without limitation, magnet tolerances, excessive flash, poor mold fill, inadequate magnet retention and imbalance issues. Accordingly, a recognized need exists to identify and develop alternative magnet retention systems for rotor units in electric water pumps.

SUMMARY OF THE INVENTION

This section provides a general summary of the disclosure and is not intended to represent a comprehensive summary of all of its features, advantages, aspect and/or objectives.

It is an aspect of the present disclosure to provide an electric fluid pump having a rotor unit including a non-overmolded magnet carrier assembly.

It is another aspect of the present disclosure to provide an electric fluid pump having a rotor unit including a multi-piece carrier assembly configured to locate and retain a plurality of magnets.

It is another aspect of the present disclosure to provide an electric fluid pump having a rotor unit including a multi-piece carrier assembly configured to locate and retain a plurality of exposed magnets, preferably ferrite magnets.

It is another aspect of the present disclosure to provide an electric fluid pump with a rotor unit equipped with a thermally welded, such as sonically-welded, two-piece magnet carrier assembly.

A rotor unit constructed in accordance with one aspect of the invention includes a carrier assembly having a tubular boss segment extending about a central rotor axis. The carrier assembly has a plurality of circumferentially spaced through openings located radially outwardly from the tubular boss segment, and a metal tubular member is supported on the tubular boss segment. A plurality of magnets are contained in the through openings and engage the metal tubular member, and wherein the carrier assembly has first and second carrier members fixed to one another by a plurality of circumferentially spaced bond joints.

It is another aspect of the present disclosure to provide a method of constructing an electric fluid pump having a rotor unit including a bonded, two-piece magnet carrier assembly.

It is another aspect of the present disclosure to provide a method of constructing a rotor unit for an electric fluid pump, with the rotor unit having a bonded, two-piece magnet carrier assembly.

A method of constructing a rotor unit in accordance with one aspect of the invention includes providing first and second carrier members; supporting a metal tubular member on a tubular boss segment of at least one of the first and second carrier members; disposing a plurality of magnets within a plurality of through openings defined by the first and second carrier members; and bonding the first and second carrier members to one another to fix the magnets within the through openings.

It is a related aspect to provide a two-piece carrier assembly configured to include a hub and a retainer plate each having a plurality of circumferentially-spaced and axially-aligned lugs defining magnet retention pockets therebetween. Cam portions of each lug are configured to engage complimentary cam portions of the magnets upon pre-assembly of the magnets and flux core into the magnet pockets. Upon thermally welding the axially aligned lugs to one another, the interaction of the cam portions of the lugs and the cam portions of the magnets, facilitated by at least slight rotation of the separate carrier assembly pieces relative to one another, causes the magnets to move radially inwardly into complete contact with a flux core. Upon completion of the thermal welding process, preferably a sonic-welding process, the two-piece carrier assembly functions to precisely locate and retain the magnets both axially and radially for use in a well-balanced rotor unit.

It is a further aspect to account for and accommodate tolerance variability in the magnet dimensions by using crush ribs on at least one of the carrier assembly pieces, including a hub and retainer plate, wherein the crush ribs are at least partially melted and/or deformed during the sonic welding process.

It is a further aspect of the present disclosure to employ a sonic welding process where at least one of the hub and the retainer plate is rotated relative to the other of the hub and the retainer plate.

These and other aspects of the present disclosure are directed to, and embodied in, an electric fluid pump, such as a water pump, having a stator unit adapted to generate a magnetic field in response to a control signal and a rotor unit, enclosed by the stator unit, adapted to rotate relative to the stator unit in response to the magnetic field generated by the stator unit. The rotor unit includes a retainer plate and a hub configured to define a two-piece magnet carrier assembly, a flux core, and a plurality of magnets. The hub is a plastic component configured to include a plate segment, a cylindrical first boss segment extending axially from a first face surface of the plate segment, a cylindrical second boss segment extending axially from a second face surface of the plate segment, and a plurality of circumferentially-spaced lug segments extending axially from the first face surface of the plate segment. A central hub aperture extends through the plate segment and the first and second boss segments. The hub lug segments have end surfaces spaced radially outwardly relative to an outer surface of the first boss segment to define an annular hub channel therebetween. The retainer plate is a plastic component configured to include a plate segment having a central aperture, and a plurality of circumferentially-spaced lug segments extending axially from a first face surface of the plate segment. The retainer lug segments have end surfaces spaced radially outwardly from the central aperture to define an annular retainer channel. The flux core is a metal tubular component adapted to be installed in the hub channel of the hub and the retainer channel of the retainer plate. The flux core has an inner diameter surface configured to surround the outer surface of the first boss segment and an outer diameter surface configured to engage the end surfaces of the hub lugs and the retainer lugs. The plurality of magnets include arcuate magnet sections, with each magnet section being located between a pair of adjacent hub lug segments of the hub and between a pair of adjacent retainer lug segments of the retainer plate, which together define magnet retention pockets. The hub lug segments include cam surfaces configured to engage complimentary cam surfaces of each magnet section. Likewise, the retainer lug segments include cam surfaces configured to engage complimentary cam surfaces of each magnet section. Following pre-assembly of the rotor unit components, a bonding process is performed to thermally weld the hub lug segments to the retainer lug segments. During the bonding process, relative rotation between the hub and retainer plate about the rotor axis causes a cam action between the cam surfaces of the magnet sections and the cam surfaces of the hub lug segments and the retainer lug segments to effectively drive the magnet sections radially inwardly into contact with the outer surface of the flux core, which in turn, precisely locates and retains the magnet sections within the magnet retention pockets of the bonded two-piece carrier assembly.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

FIG. 13 is an assembled perspective view of the components shown in

FIG. 12;

DETAILED DESCRIPTION OF PRESENTLY PREFERRED EMBODIMENTS

Figure 1:
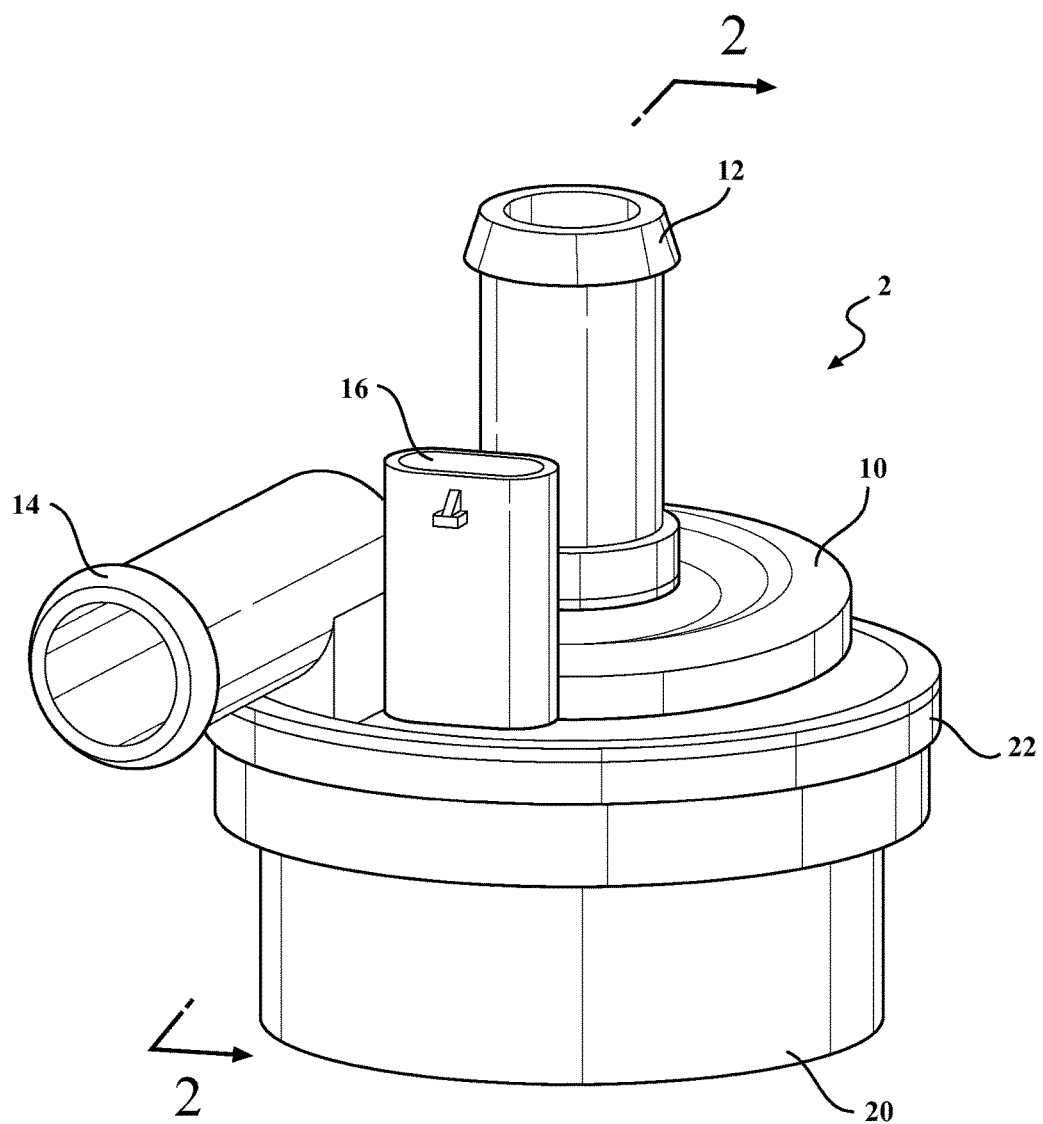
FIG. 1 is a perspective view of an exemplary embodiment of an electric water pump adapted to incorporate the teachings of the present disclosure.
Figure 2:
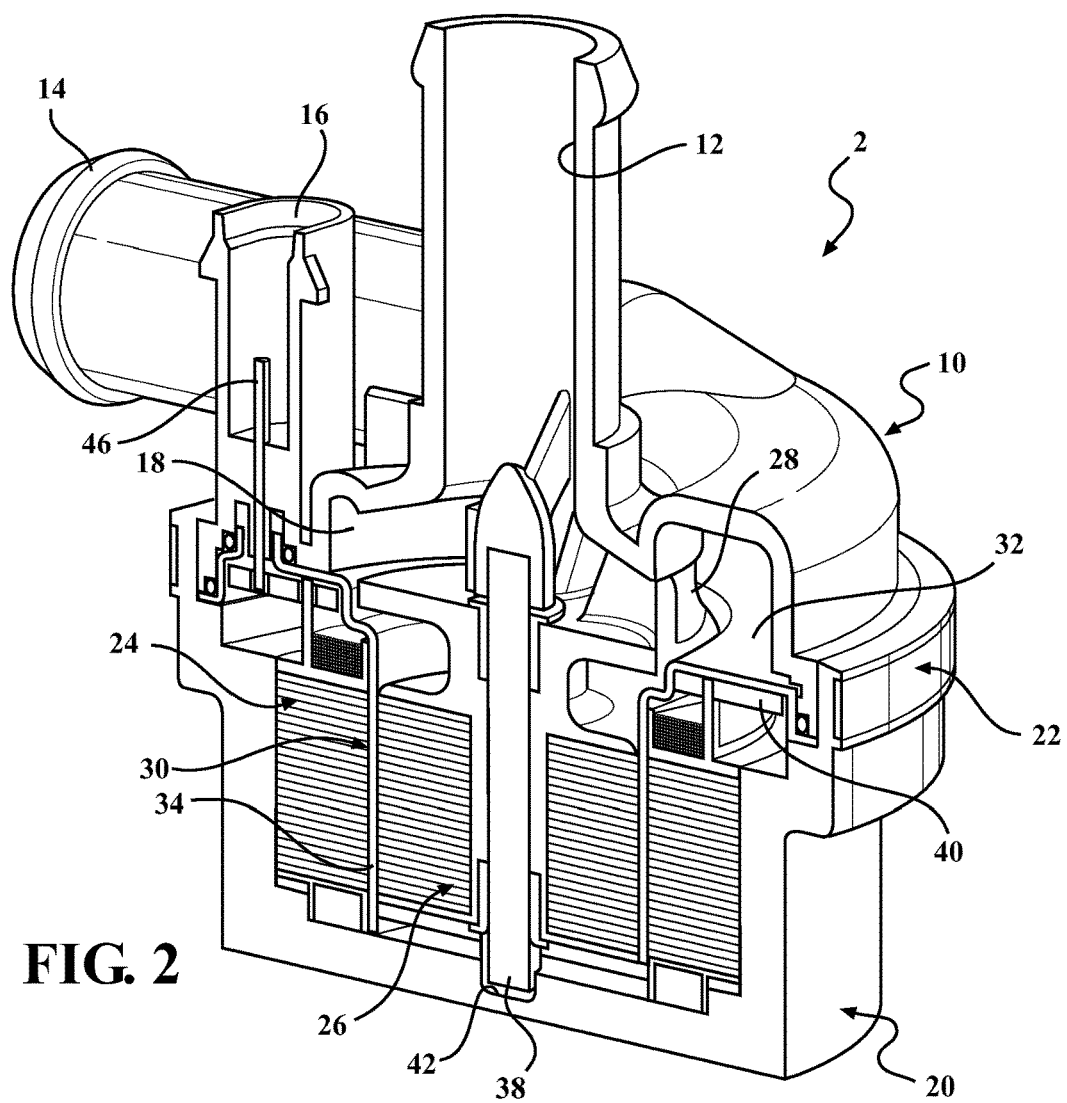
FIG. 2 is a sectional view of the electric water pump taken generally along line 2-2 of FIG. 1.

Referring in general to all of the figures, the present disclosure and teachings described herein are directed to electric water pumps of the type particularly well-suited for use in motor vehicle applications. While disclosed in accordance with one or more specific exemplary constructions, the electric water pump of the present disclosure may be any electrically-powered pump that moves a fluid which may include, but not be limited to, air, water, anti-freeze, coolant or oil. The inventive concepts disclosed are generally directed to various versions of an improved rotor unit for use in electric water pumps. The improved rotor units include a two-piece magnet carrier assembly. The two-piece carrier assembly is preferably made of a plastic material capable of being secured together without the use of mechanical fasteners. A thermal welding process, such as a sonic-welding process, is one preferred connection method. The carrier assembly locates and retains one or more magnets without use of an over-molding process and utilizes a camming action to provide the enhanced magnet location and retention characteristics.

Referring initially to FIGS. 1-6, an exemplary electric fluid pump, referred to hereafter as water pump 2, is generally shown to include a pump housing 10, a motor housing 20 and a fastener, such as a band clamp 22, for connecting pump housing 10 to motor housing 20. Pump housing 10 is shown to include an inlet 12 and an outlet 14 in fluid communication with a volute fluid chamber 18. Pump housing 10 is also shown to include a power supply connector 16. Water pump 2 further includes a toroidal stator unit 24 which may be retained (i.e., press fit) within a motor chamber formed in motor housing 20, and a rotor unit 26 disposed within and surrounded by stator unit 24. As is known, stator unit 24 is configured to generate a magnetic field in response to an electric control signal, while rotor unit 26 is configured to rotate within the stator unit 24 in response to the magnetic field generated by the stator unit 24. In the particular embodiment shown, a tubular wetsleeve 30 separates and seals off rotor unit 26 from stator unit 24, wherein the wetsleeve 30 is generally configured to inhibit fluid from contacting stator unit 24. Rotor unit 26 is rotatably supported on a shaft 38 having a first end retained in a boss formed in motor housing 20 and a second end retained in a boss formed in pump housing 10. An impeller 28 is fixed to, or formed integrally with, rotor unit 26 for common, conjoint rotation therewith in response to energization of stator unit 24. As is known, rotation of impeller 28 cause fluid within the vehicle's coolant system to flow from inlet 12 to outlet 14 through volute fluid chamber 18.

Figure 3:
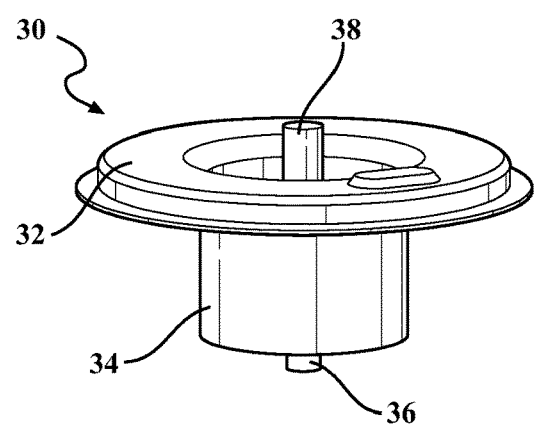
FIG. 3 illustrates a wetsleeve associated with the electric water pump of FIGS. 1 and 2.
Figure 4:
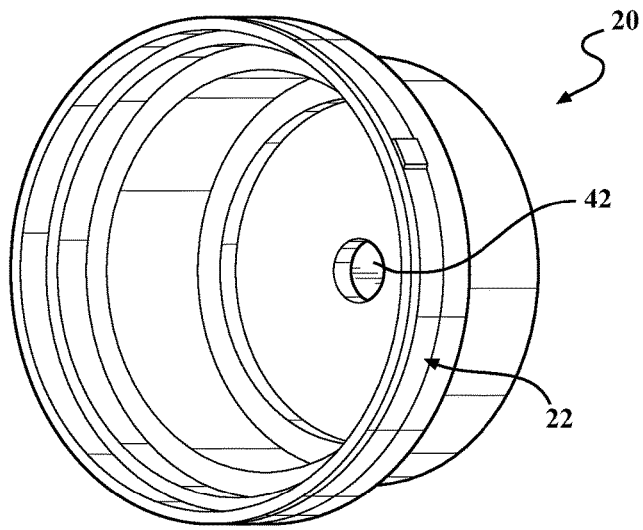
FIG. 4 illustrates the motor housing associated with the electric water pump of FIGS. 1 and 2.
Figure 5:
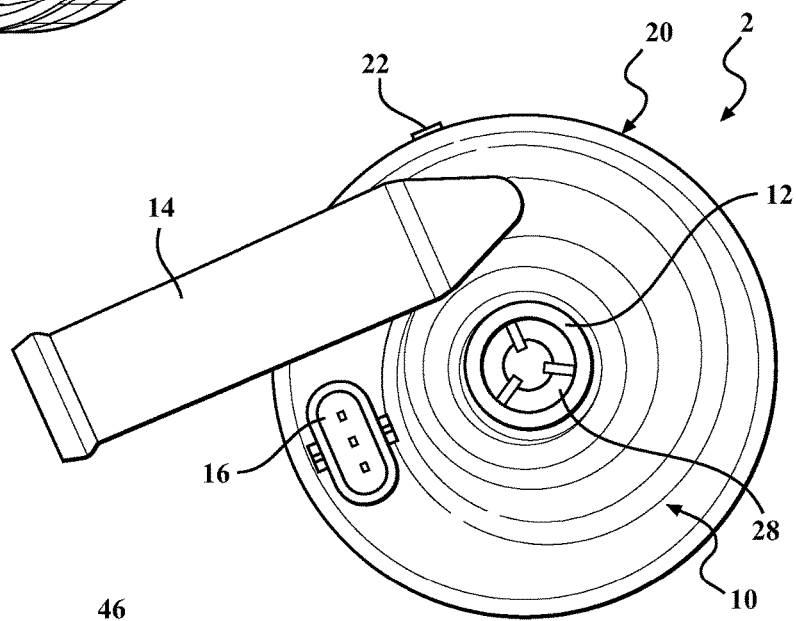
FIG. 5 is a top view of the electric water pump shown in FIG. 1.
Figure 6:
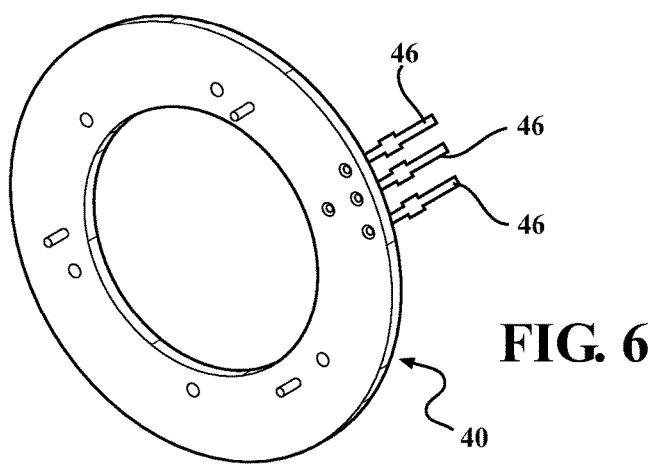
FIG. 6 illustrates the control board associated with the electric water pump of FIG. 1.
Figure 7:
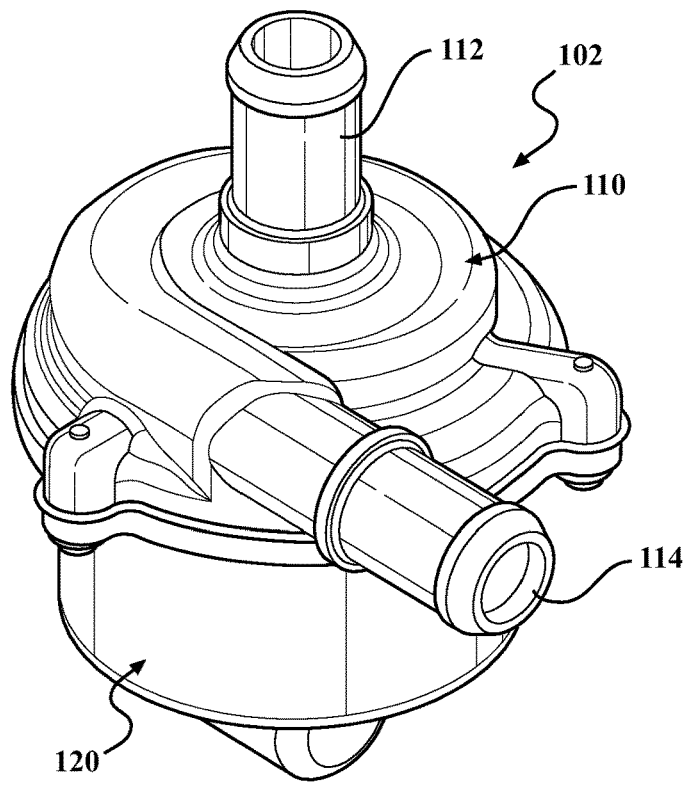
FIG. 7 is a top perspective view of another exemplary embodiment of an electric water pump adapted to incorporate the teachings of the present disclosure.
Figure 8:
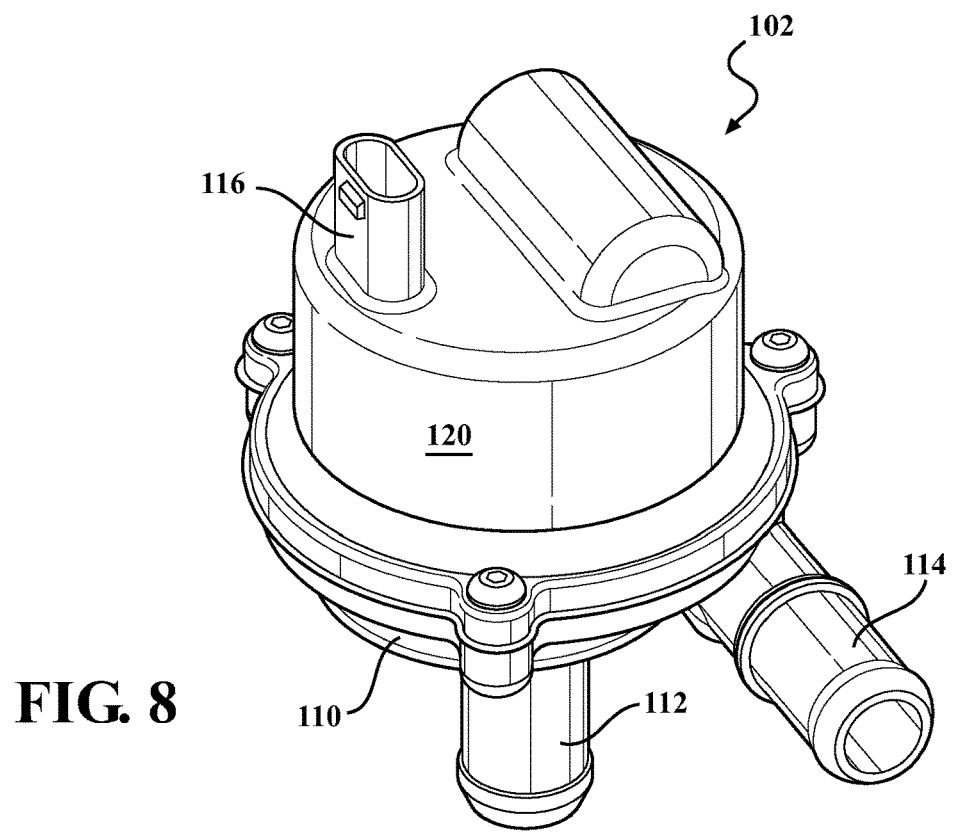
FIG. 8 is a bottom perspective view of the electric water pump shown in FIG. 7.
Figure 9:
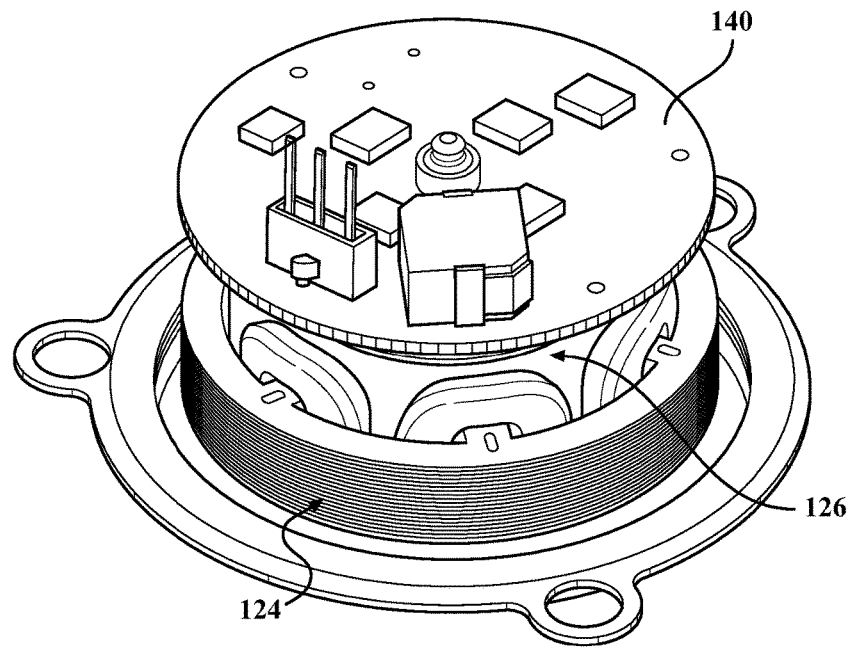
FIG. 9 is a perspective view of the electric motor components associated with the electric water pump of FIGS. 7 and 8.
Figure 10:
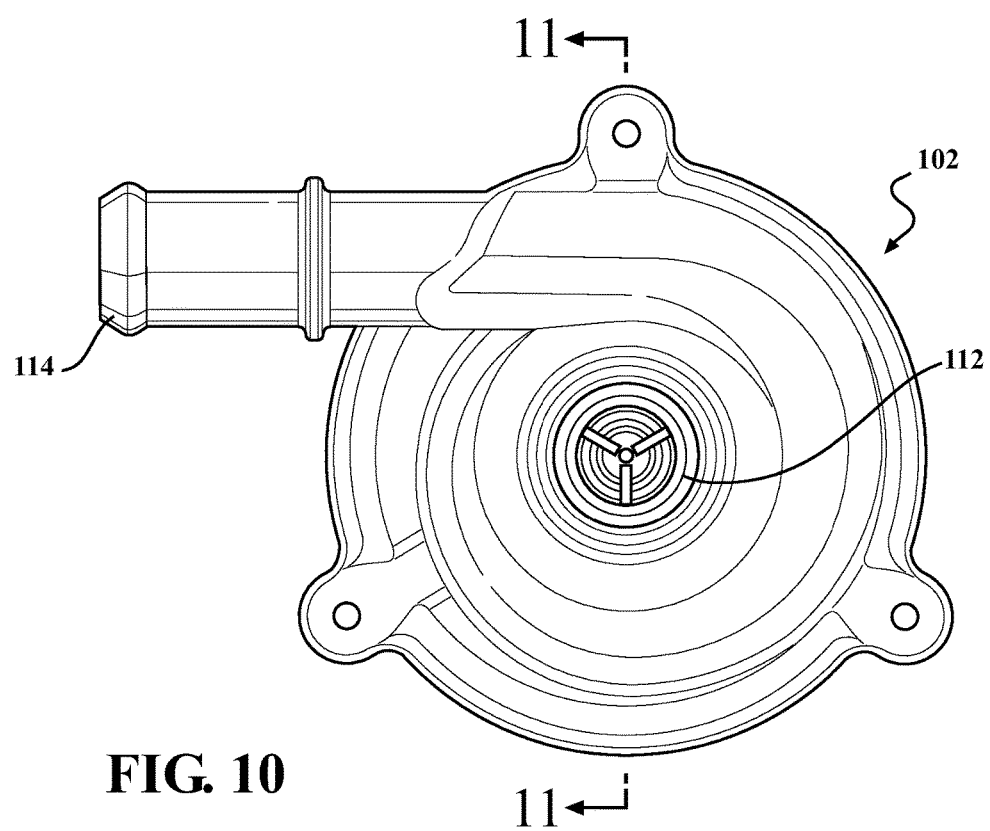
FIG. 10 is a top view of the electric water pump of FIGS. 7 and 8.

FIG. 3 illustrates the configuration of wetsleeve 30 which includes a cap portion 32, a sleeve portion 34 that fits within stator unit 24 and houses rotor unit 26. Cap portion 32 includes a power adaptor that is in electrical connection with stator unit 24. Sleeve portion 34 includes a seat 36 sized to be retained within the boss 42 in motor housing 20 and which supports the lower end of shaft 38. A driver unit, such as an electronic control board 40, is located outside of wetsleeve 30 and is configured to electronically interconnect the windings of stator unit 24 to power supply connector 16 via a plurality of power terminals 46.

Figure 11:
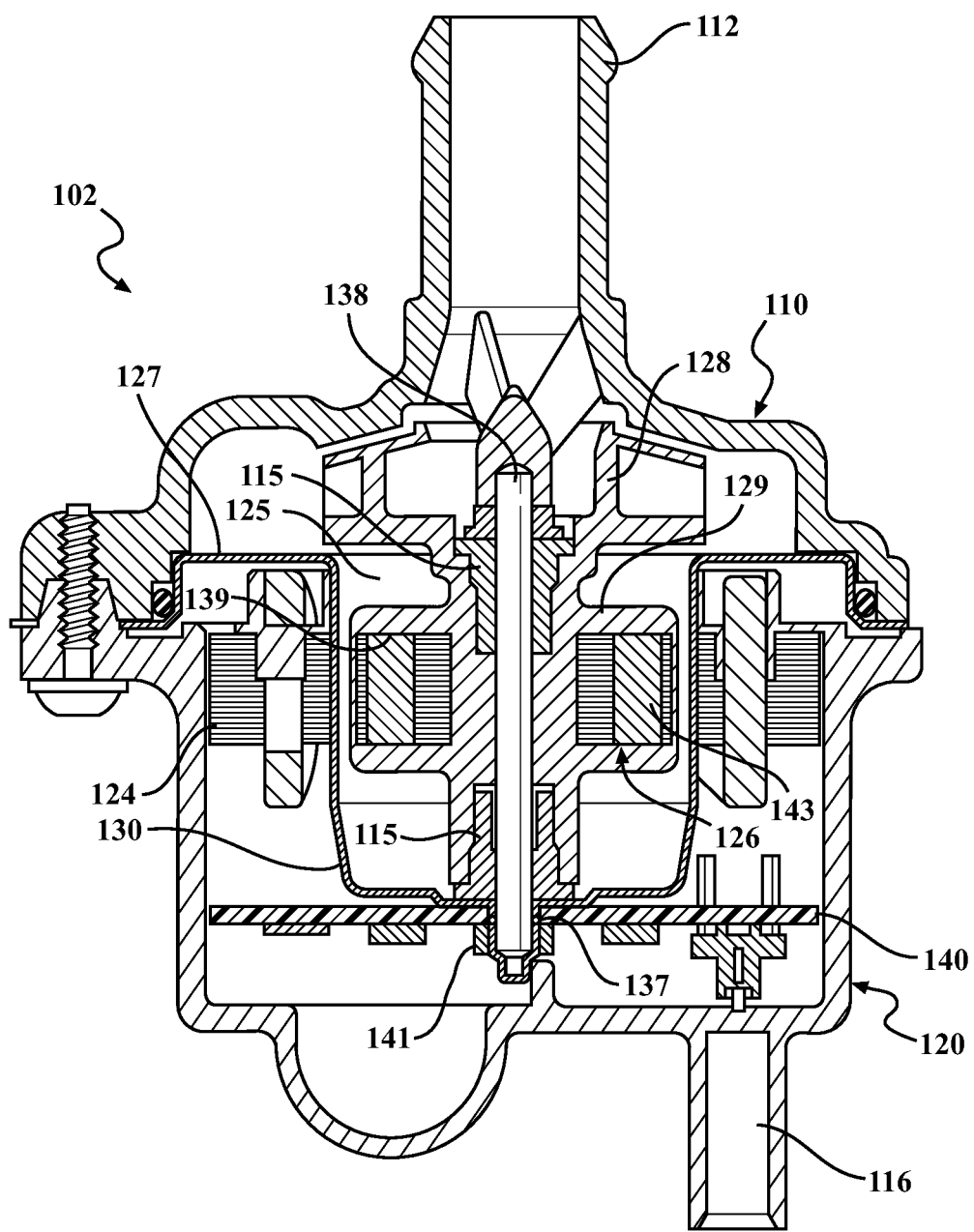
FIG. 11 is a sectional view of the electric water pump shown in FIGS. 7 and 8, taken generally along line 11-11 of FIG. 10.

Referring now to FIGS. 7-14, an alternative embodiment of an electric water pump 102 is shown. Components of electric water pump 102 which are common with or similar to those of electric water pump 2 are identified by the same reference numerals used above, offset by a factor of 100. In general, electric water pump 102 has a pump housing 110, a motor housing 120, an inlet 112, an outlet 114, but differs from the water pump 2 in that the electronics are located near the bottom such that power connector 116 now extends through motor housing 120. The revised arrangement of components is best shown in FIG. 11 with wetsleeve 130 positioned above electronic control board 140. As seen, wetsleeve 130 defines a chamber 125 exposing rotor unit 126 to the coolant. A pair of bushings 115 support rotor unit 126 for rotation on shaft 138. The lower end of shaft 138 extends through a copper ring 137 of electronic control board 140 and a lock nut 141 secures electronic control board 140 to wetsleeve 130. Wetsleeve 130 includes a flange 127 which extends over the top of stator unit 124. Stator unit 124 is located to surround wetsleeve 130 and is connected thereto using any suitable retention mechanism or method.

The configuration of electric fluid pumps, referred to hereafter as water pumps 2 and 102, allow for the use of ferrite magnets on rotor units 26, 126. The use of ferrite magnets is more cost effective and may provide better magnetic properties compared to rare earth magnets, with rare earth magnets needing to be embedded and shielded (encapsulated or overmolded) into the rotor unit to avoid exposure to the coolant, thereby attenuating the strength of the magnetic field therefrom.

Figure 12:
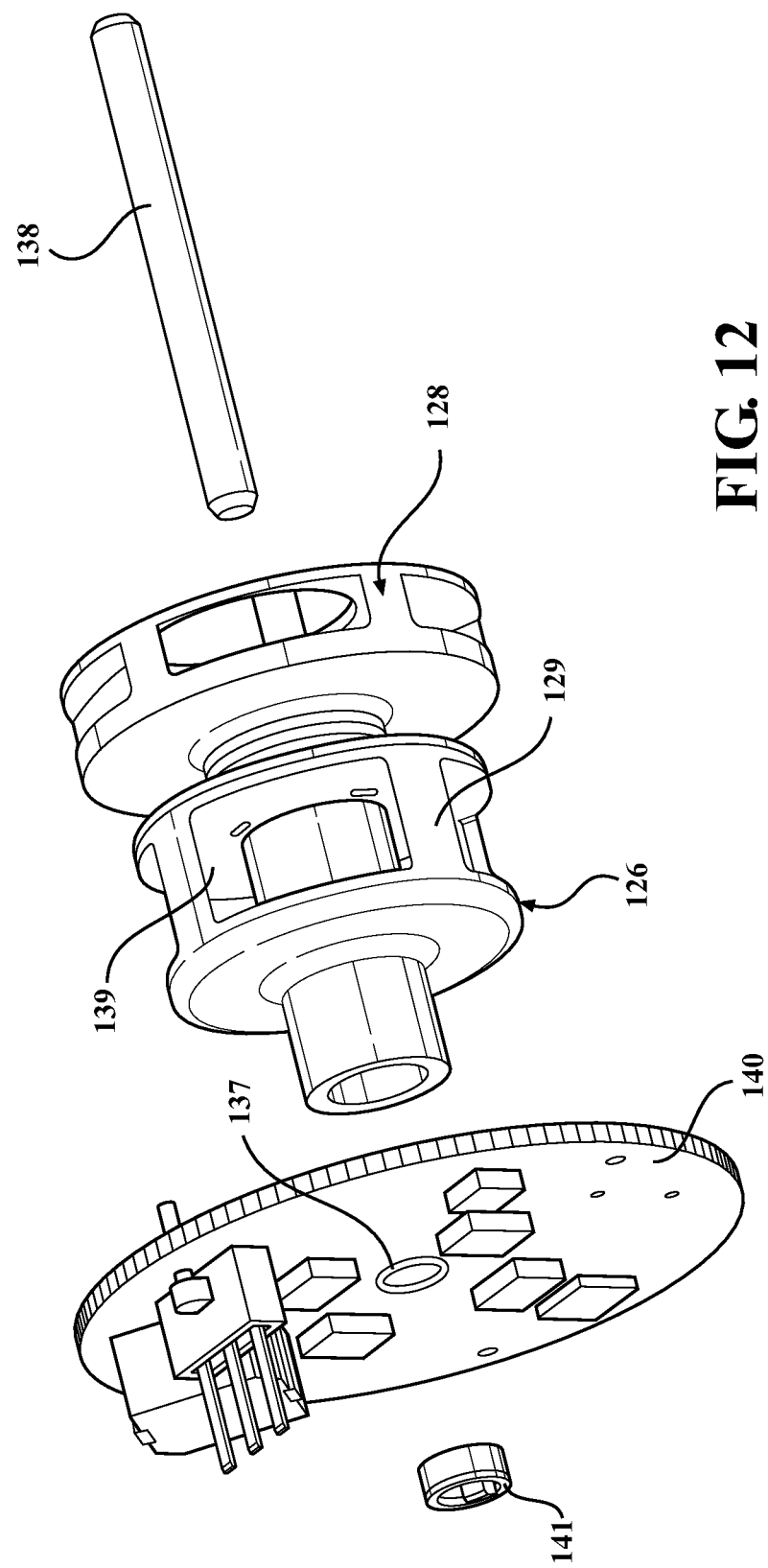
FIG. 12 is an exploded perspective view of a rotor unit and control board associated with the electric water pump of FIGS. 7-11.
Figure 13:
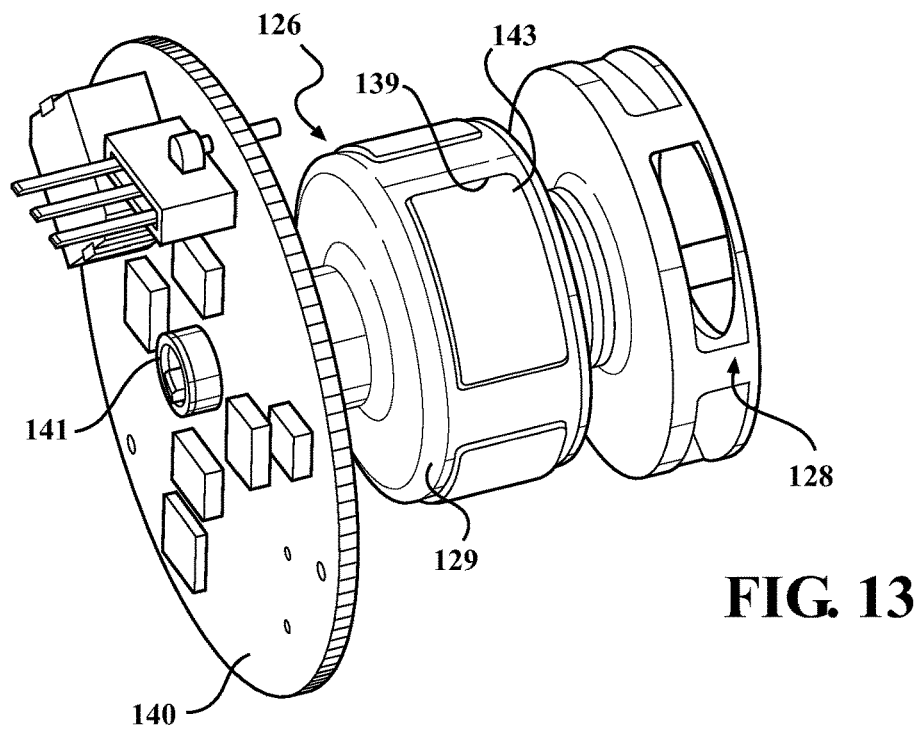
Figure 14:
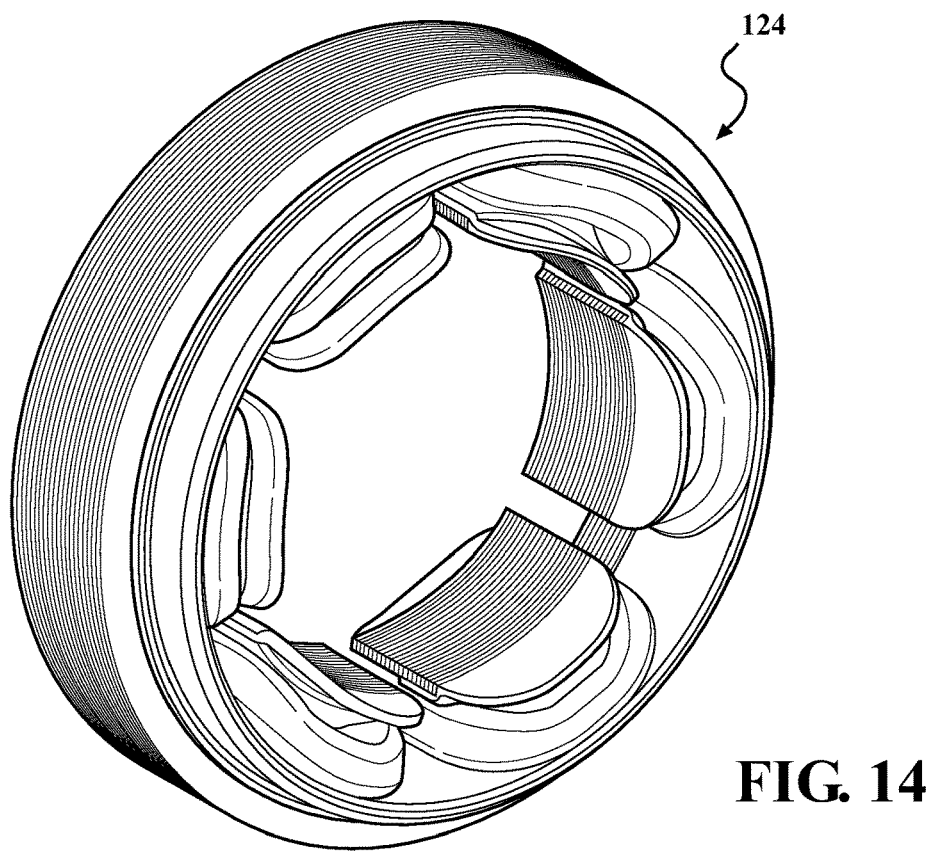
FIG. 14 is a perspective view of the stator unit associated with the electric water pump of FIGS. 7-11.
Figure 15:
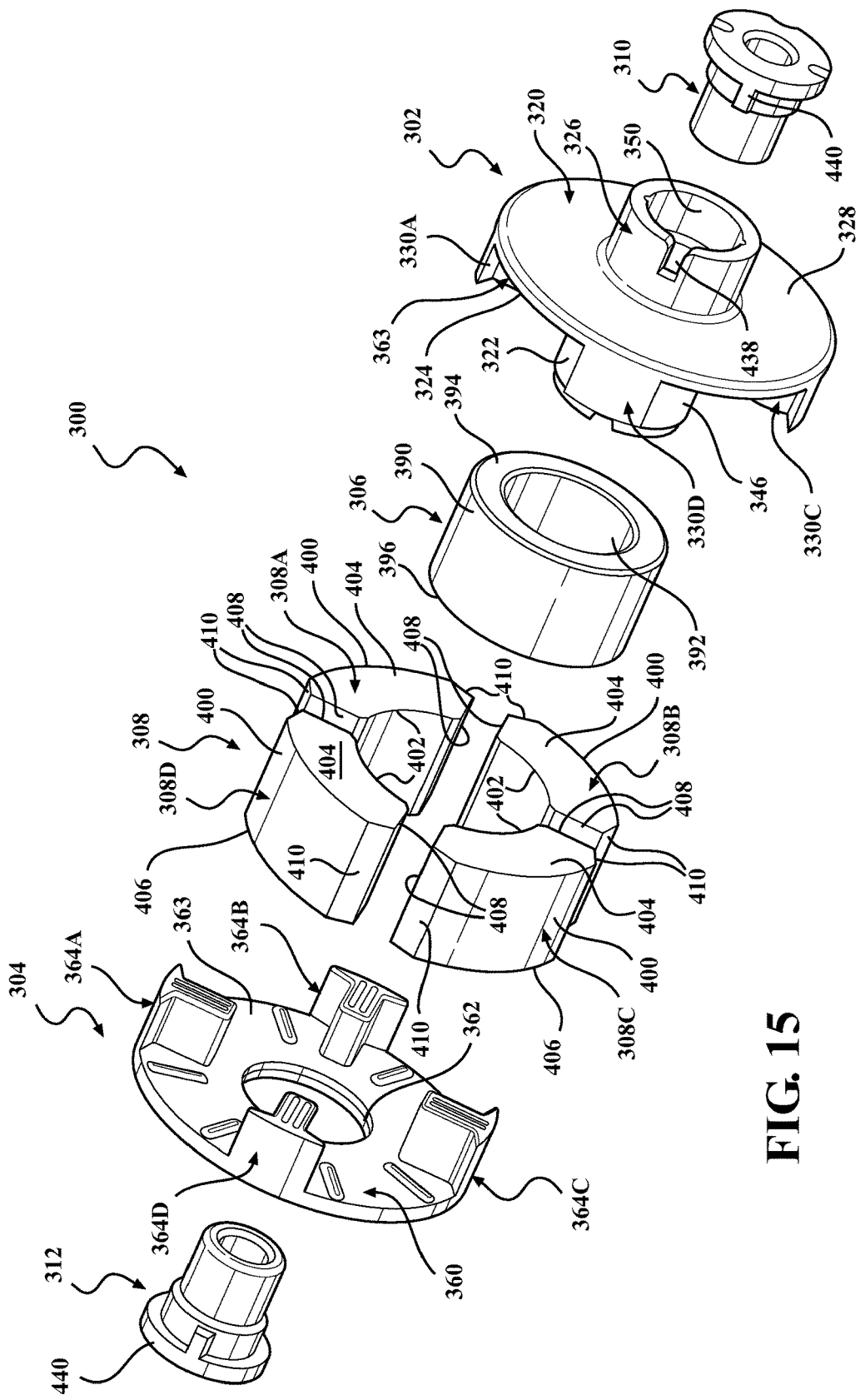
FIG. 15 is an exploded perspective view of a rotor unit adapted for use with versions of the electric water pumps shown above and which incorporates the teachings of the present disclosure.
Figure 16:
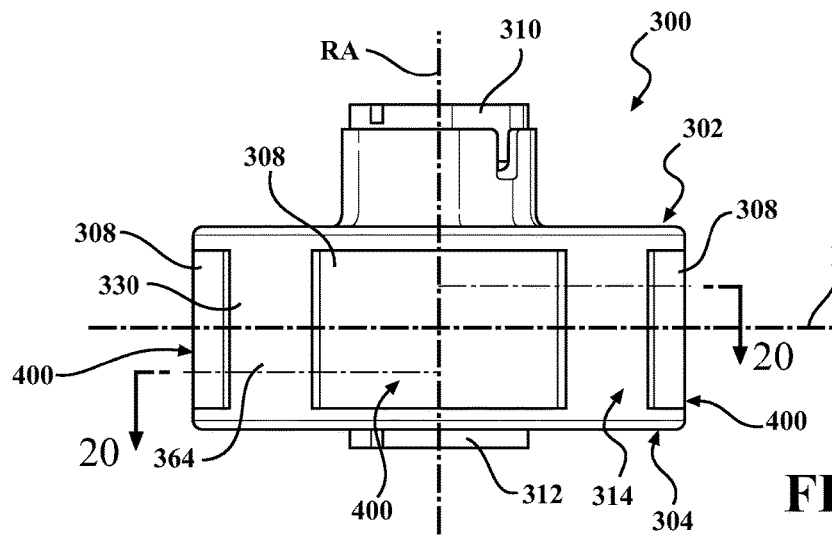
FIG. 16 is an assembled view of the rotor unit shown in FIG. 15.
Figure 17:
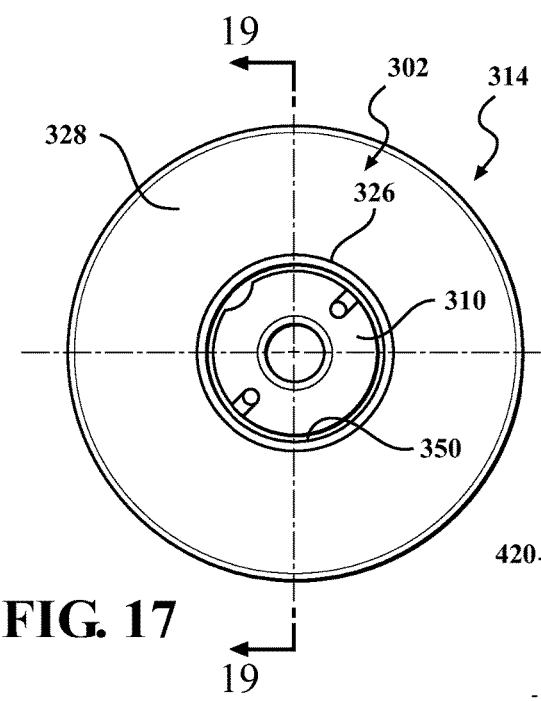
FIG. 17 is a first end view of the rotor unit shown in FIG. 16.
Figure 18:
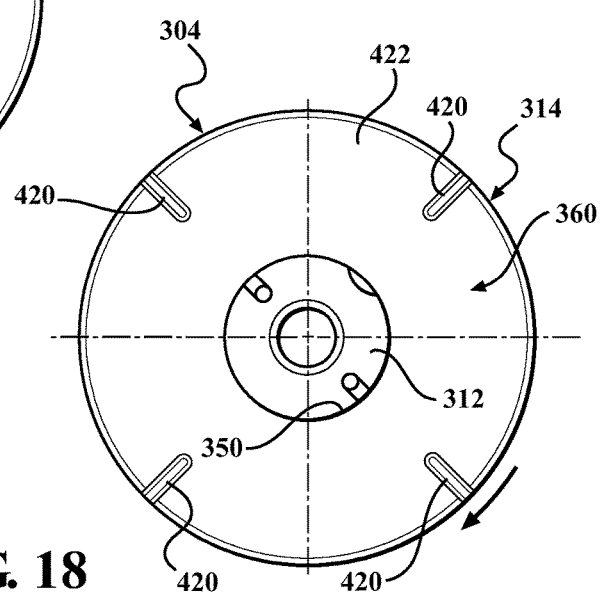
FIG. 18 is a second end view of the rotor unit shown in FIG. 16.
Figure 19:
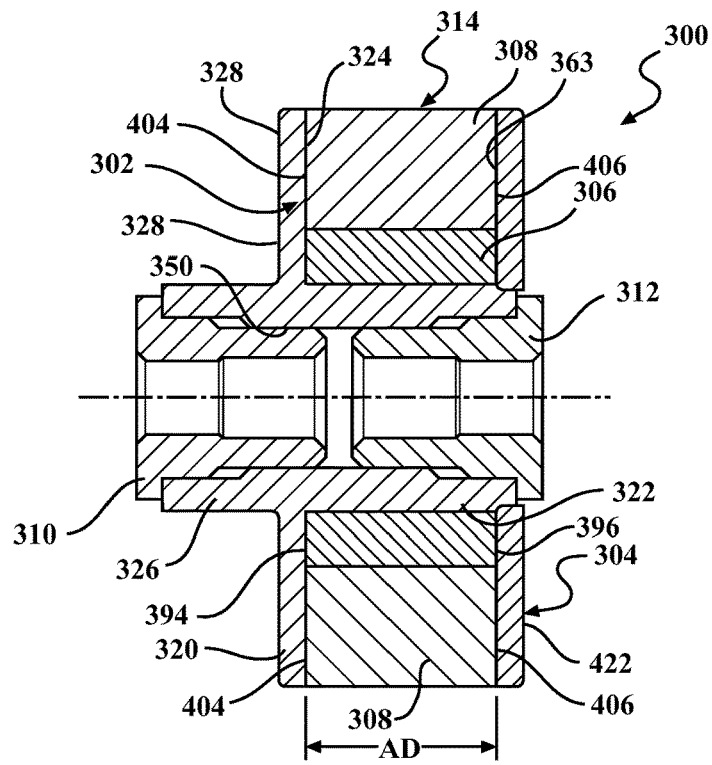
FIG. 19 is a sectional view of the rotor unit taken generally along line "19-19" of FIG. 17.

Referring to FIGS. 11-13, a configuration for rotor unit 126, impeller 128 and electronic control board 140 is shown. In particular, rotor unit 126 includes a one-piece magnet carrier 129 having apertures 139 for receiving and locating ferrite magnets 143. In the arrangement shown, carrier 129 is a molded component configured to retain magnets 143 therein.

The present disclosure is generally directed to improved rotor units having a magnet retention arrangement for exposed ferrite magnets and which eliminates the need to over-mold the magnets within the carrier. To this end, FIGS. 15 through 23 illustrate a first exemplary embodiment of an improved rotor unit 300 constructed in accordance with one aspect of the invention that is adapted for use in electric water pumps of the type generally disclosed herein, and as discussed above. Rotor unit 300 can be mounted on shaft 38, 138 for conjoint rotation therewith. In general, rotor unit 300 includes a first carrier member, referred to hereafter as hub 302, a second carrier member, referred to hereafter as retainer 304, a tubular flux core member, referred to hereafter as flux core 306, a plurality of arcuate magnets 308, and a pair of sleeve bushings 310, 312. As will be detailed, flux core 306 and magnets 308 are configured and arranged to be installed in and retained between hub 302 and retainer 304, which together, the hub 302 and retainer 304 define a two-piece carrier assembly 314.

Figure 23:
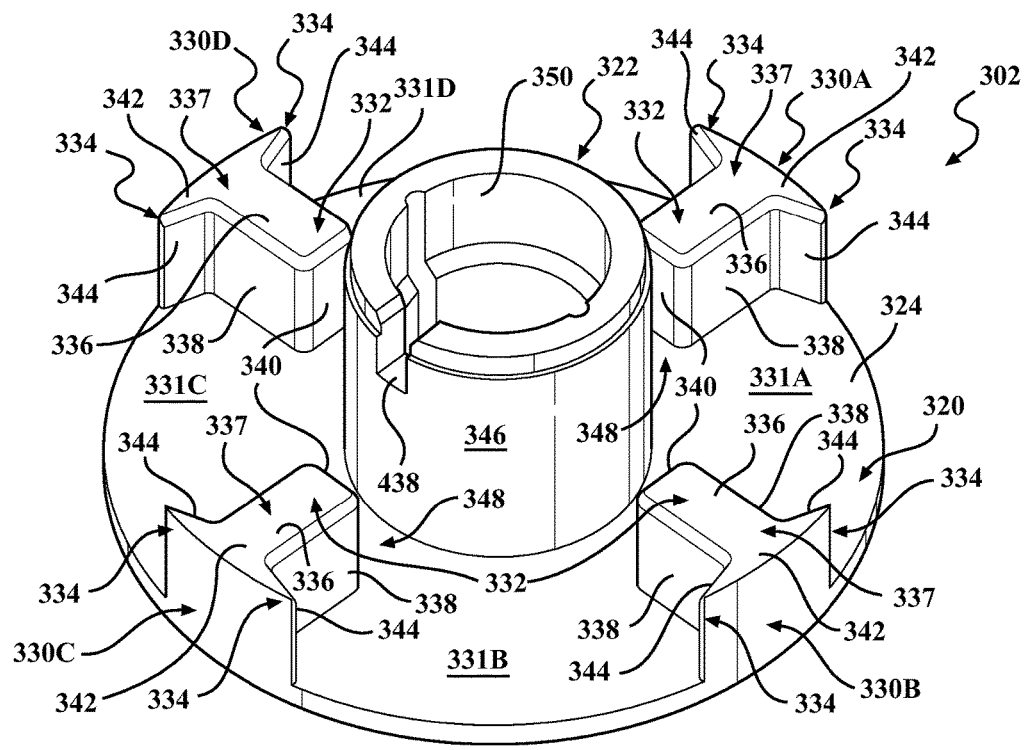
FIG. 23 is an isometric view of the hub associated with the rotor unit shown in FIGS. 15-21.
Figure 24:
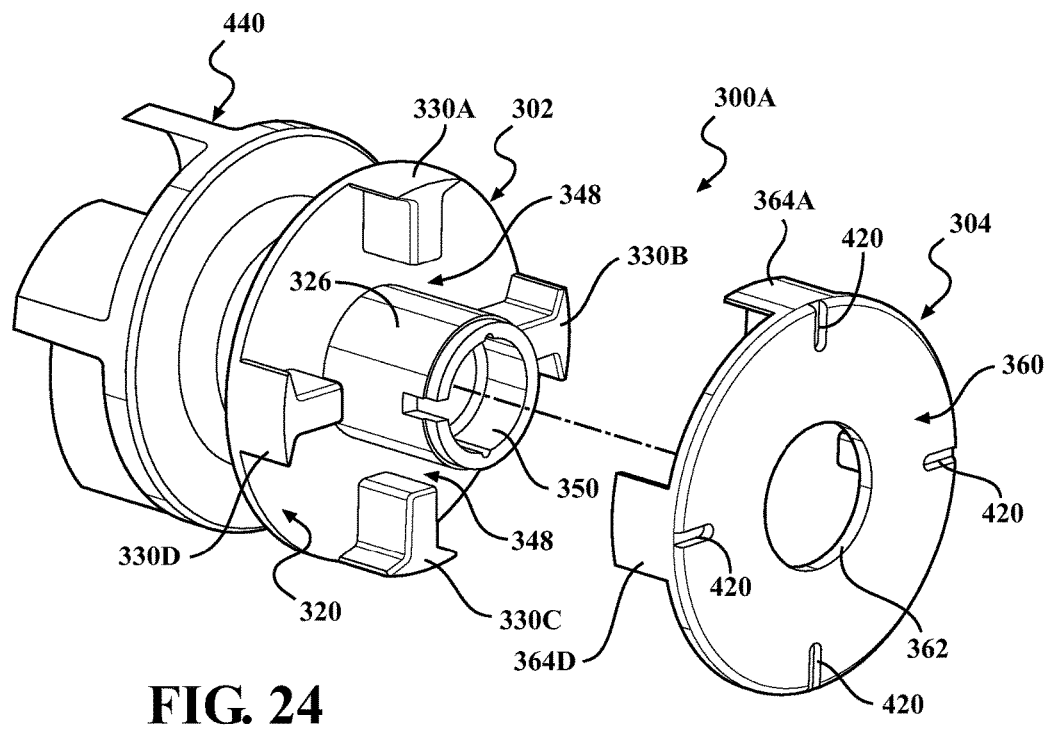
FIGS. 24 and 25 are exploded perspective views of an alternative configuration for a rotor unit adapted for use with versions of the electric water pumps and embodying the teachings of the present disclosure.
Figure 25:
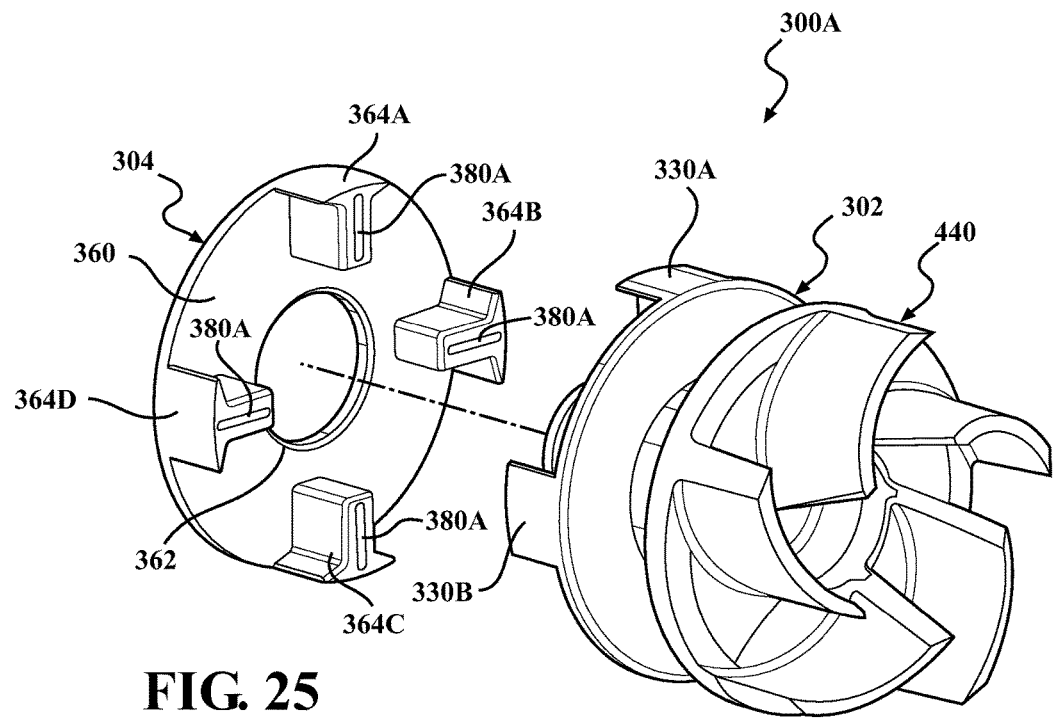
Figure 26:
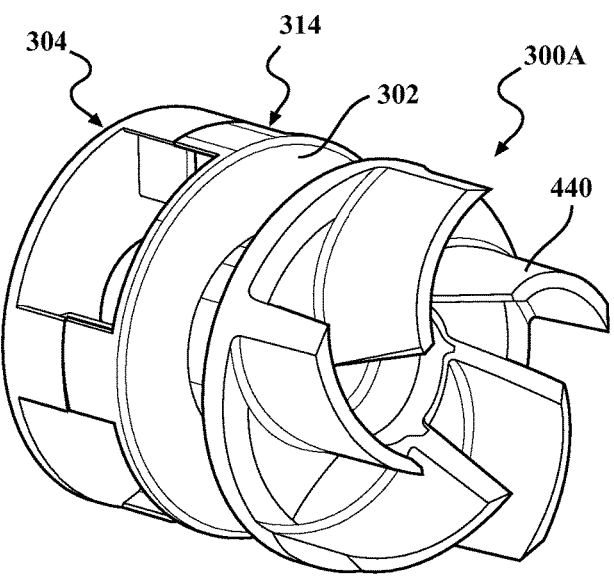
FIG. 26 is an assembled view of the rotor unit shown in FIGS. 24 and 25.
Figure 27:
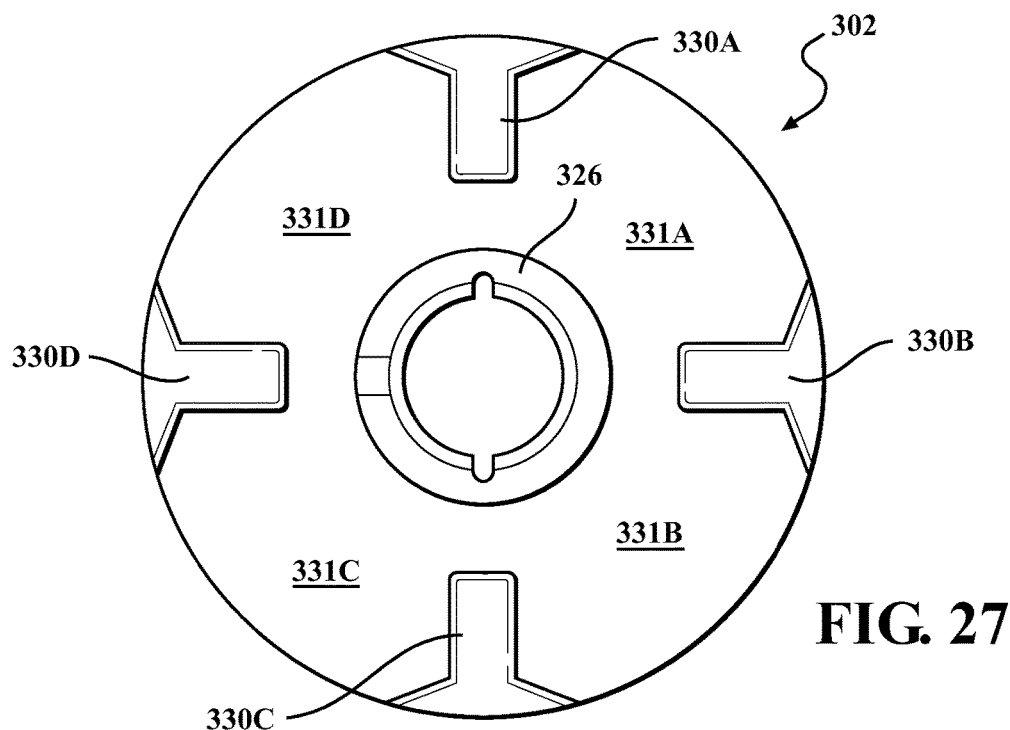
FIG. 27 is an end view of the retainer plate associated with the rotor unit shown in FIGS. 24-26.
Figure 28:
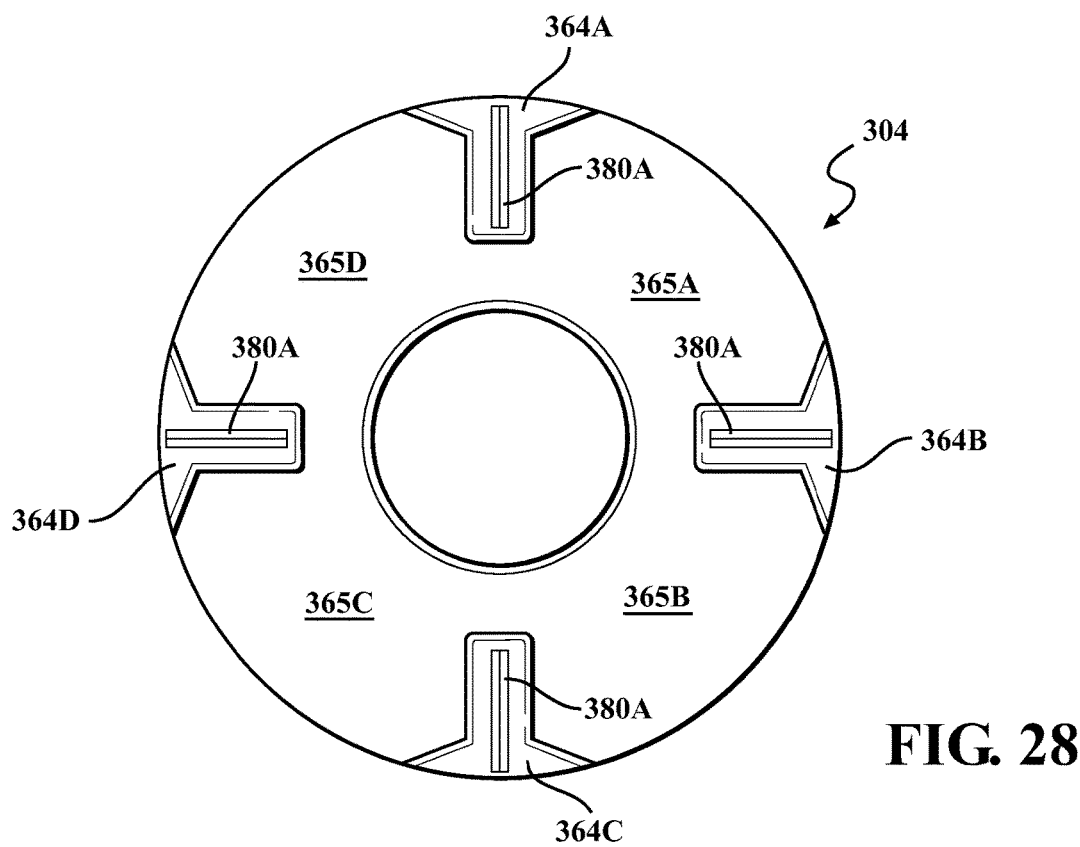
FIG. 28 is an end view of the hub associated with the rotor unit shown FIGS. 24-26.
Figure 29:
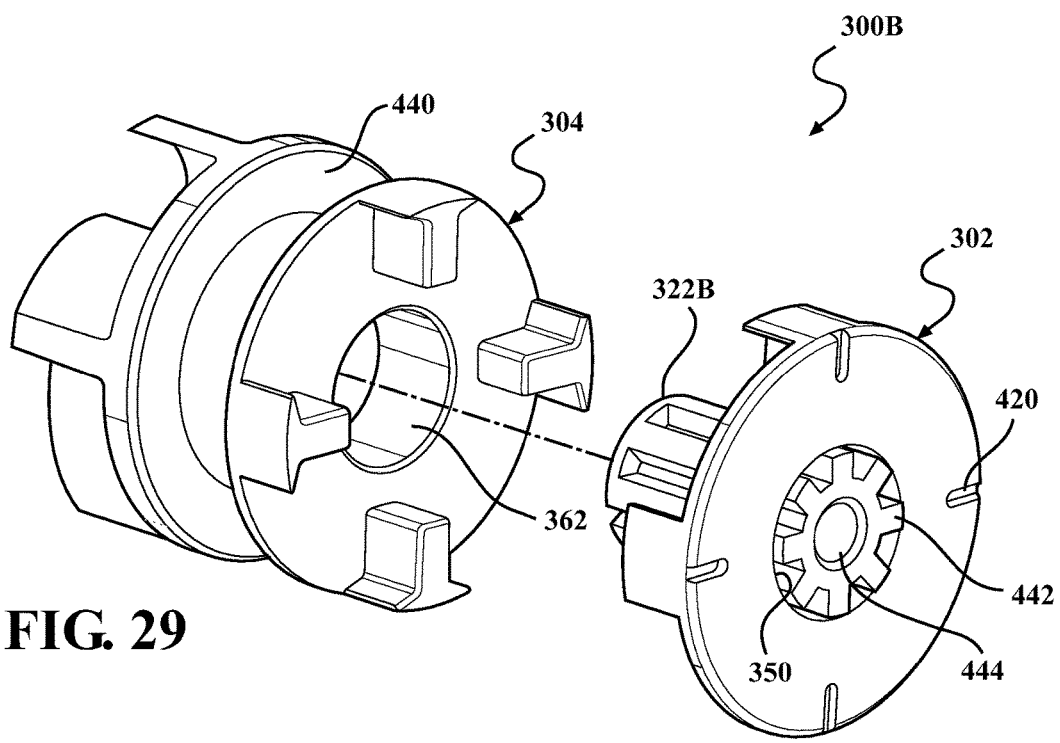
FIGS. 29 and 30 are exploded perspective views of another alternative configuration for a rotor unit embodying the teachings of the present disclosure.
Figure 30:
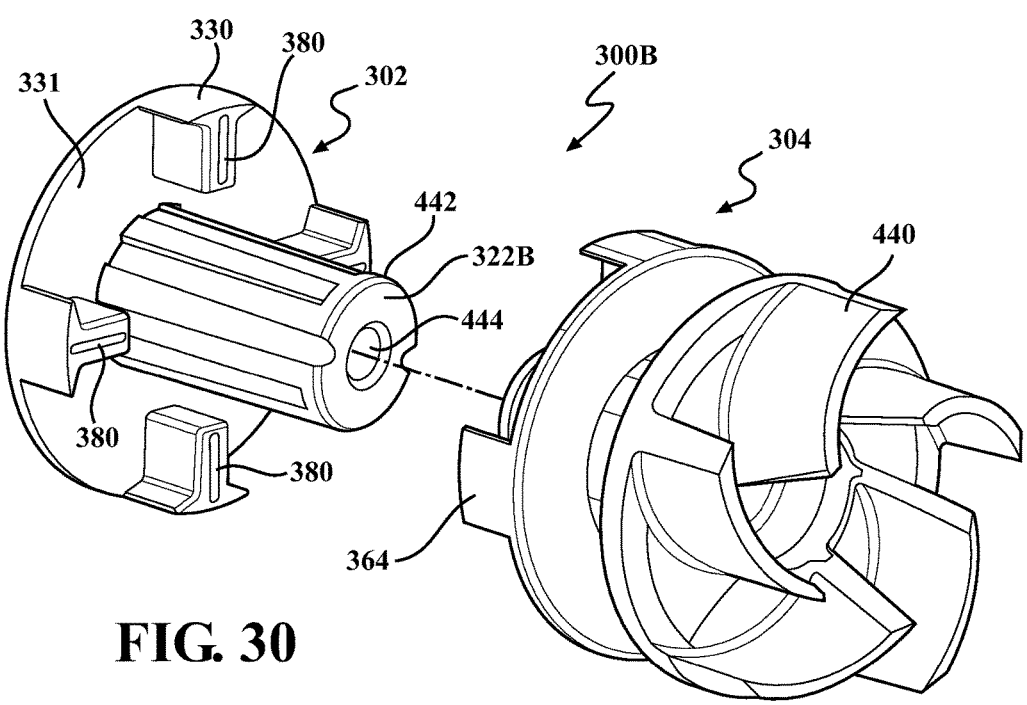
Figure 31:
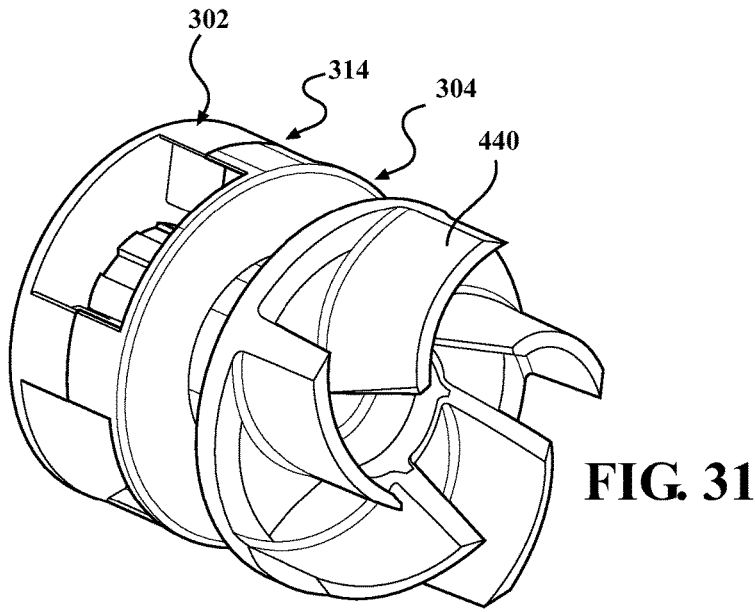
FIG. 31 is an assembled view of the rotor unit shown in FIGS. 29 and 30.
Figure 32:
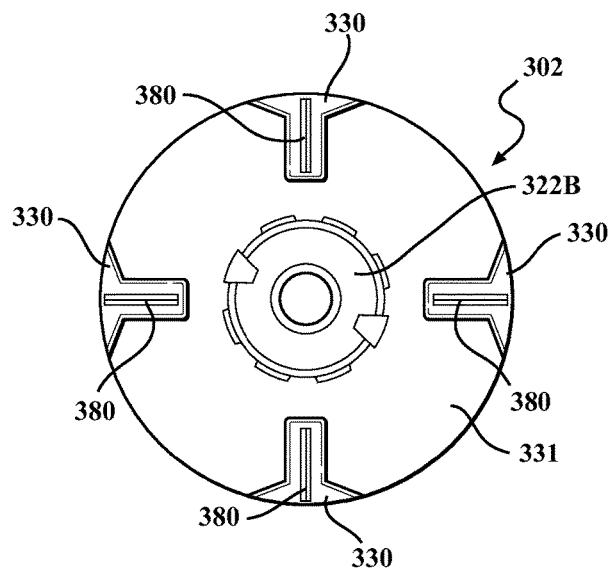
FIG. 32 is an end view of the hub associated with the rotor unit shown in FIGS. 29-31.
Figure 33:
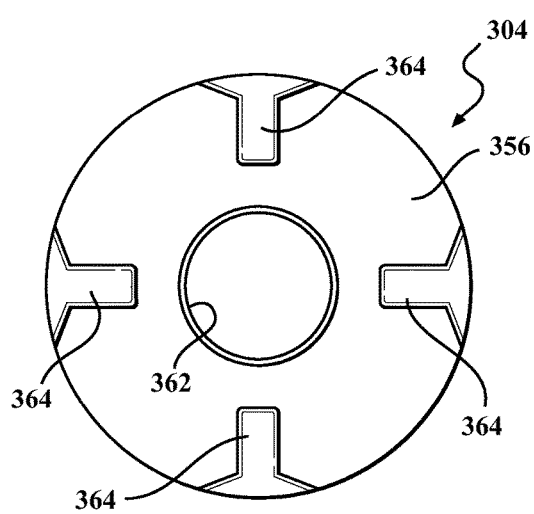
FIG. 33 is an end view of the retainer plate associated with the rotor unit shown in FIGS. 29-31.

Hub 302 is a plastic component fabricated to include a plate segment 320, a first tubular boss segment 322 extending axially from a first face surface 324 of plate segment 320, a second tubular boss segment 326 extending axially from a second face surface 328 of plate segment 320, and a plurality of circumferentially-spaced projections, also referred to as lug segments 330, extending axially outwardly from first face surface 324 and which surround first boss segment 322. First face surface 324 is generally planar and extends transversely or substantially transversely to the rotor axis RA. As best seen from FIG. 23, a plurality of four (4) lug segments 330, denoted hub lugs 330A-330D, are shown equally spaced about first boss segment 322. Hub lugs 330A-330D cooperate with first face surface 324 of plate segment 320 to define a plurality of four (4) hub pockets 331A-331D (FIG. 23). Each hub lug 330 is generally T-shaped and includes a radially-extending, elongate leg portion 332 and a pair of opposite, circumferentially-extending arcuate arm portions 334. Leg portions 332 include a planar friction surface 336, a pair of side wall surfaces 338, and an arcuate end wall surface 340. Each arm portion 334 includes a planar friction surface 342 and a tapered inner cam surface 344. Friction surfaces 342 of arm portions 334 are aligned in coplanar relation with friction surface 336 on leg portion 332 to define a continuous generally planer hub lug mounting surface 337. As seen, cam surfaces 344 of arm portions 334 extend at an angle relative to side wall surfaces 338 of leg portions 332. End wall surfaces 340 are radially offset in a radially outward direction relative to an outer cylindrical surface 346 of first boss segment 322 to define an annular hub channel 348 therebetween. An elongated central passage or aperture 350 is formed to extend generally coaxially along a central axial rotor axis RA through first boss segment 322 and second boss segment 326 of hub 302.

Figure 22:
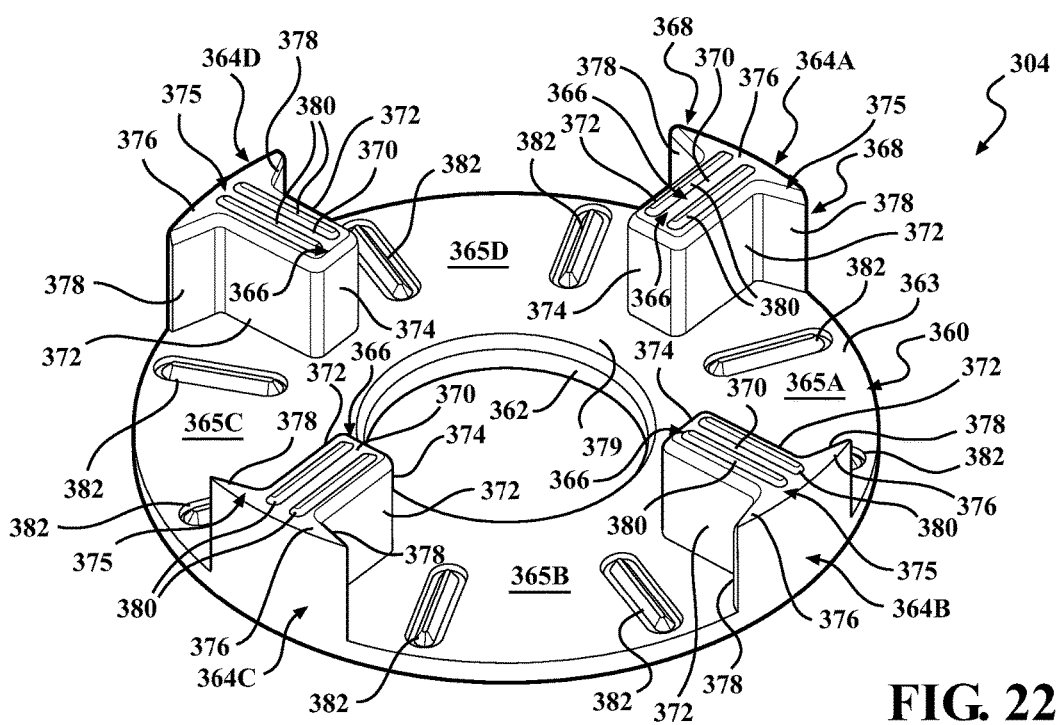
FIG. 22 is an isometric view of the retainer plate associated with the rotor unit shown in FIGS. 15-21.

Retainer 304 is a plastic component fabricated to include a plate segment 360 having a central aperture 362 extending therethrough and a plurality of circumferentially-spaced projections, also referred to as lug segments 364, extending axially outwardly from a first face surface 363 of plate segment 360. First face surface 363 is generally planar and extends transversely or substantially transversely to the rotor axis RA. As best seen from FIG. 17, a plurality of four (4) lug segments 364 are equally-spaced circumferentially from one another and denoted as retainer lugs 364A-364D. Retainer lugs 364A-D cooperate with first face surface 363 of plate segment 360 to define a plurality of four (4) retainer pockets 365A-365D (FIG. 22). Each retainer lug is generally T-shaped and includes a radially-extending elongate leg portion 366 and a pair of opposite circumferentially-extending arcuate arm portions 368. Leg portions 366 include a planar friction surface 370 extending generally parallel to first face surface 363, a pair of side wall surfaces 372, and an arcuate end wall surface 374. Each arm portion 368 includes a planar friction surface 376 extending generally parallel to first face surface 363 and a tapered inner cam surface 378. Friction surface 370 on leg portions 366 are aligned in coplanar relation with friction surfaces 376 on arm portions 368 to define a continuous planar retainer lug mounting surface 375 that is oriented in parallel relation with the first face surface 363. Cam surfaces 378 of arm portions 368 extend at an angle relative to side wall surfaces 372 of leg portions 366. End wall surfaces 374 are radially offset in spaced relation from the central aperture 362 to define an annular retainer channel 379. As seen, a pair of raised welding ribs 380 is formed on the retainer lug mounting surface 375 of each lug 364 on retainer 304. In addition, a pair of raised, radially extending crush ribs 382 is formed on the first face surface 363 of plate segment 360 within each of the retainer pockets 365A-365D.

Tubular flux core 306 is a steel component shown to define a tubular sleeve having an outer cylindrical surface 390, an inner cylindrical surface 392, a planar first end surface 394 and a planar second end surface 396. Flux core 306 is sized to be disposed in a close fit within channel 348 of hub 302 such that its inner surface 392 surrounds and engages outer surface 346 of first boss segment 322 and its outer surface 390 is surrounded by and engaged with arcuate end wall surfaces 340 of hub lugs 330. Likewise, flux core 306 is disposed within channel 379 of retainer 304 such that its outer surface 390 is surrounded by and engaged with arcuate end wall surfaces 374 of retainer lugs 364. When carrier assembly 314 is assembled, first end surface 394 of flux core 306 engages first face surface 324 of hub 302 while second end surface 396 of flux core 306 engages first face surface 363 of retainer 304 (see FIG. 19).

Magnets 308 include a plurality of four (4) magnet sections 308A-308D, each having an axial dimension about equal to the axial dimension of flux core 306 and a circumferential dimension. Each magnet 308 includes an outer surface 400, an inner surface 402, a first side wall 404, a second side wall 406, and a pair of edge surfaces 408. The axial dimension AD (FIG. 19) of the magnets 308 extends between the opposite first and second side walls 404, while the circumferential dimension CD (FIG. 20) extends between a radially outermost region of the opposite edge surfaces 408. As best seen from FIGS. 15, 20 and 21, an outer tapered cam surface 410 is formed between outer surface 400 and each edge surface 408. As constructed, inner surface 402 of each magnet 308 is adapted to engage outer surface 390 of flux core 306 when magnet sections 308A-308D are disposed in axially aligned pairs of hub pockets 331A-331D and retainer pockets 365A-365D. In particular, hub pocket 331A is axially aligned with retainer pocket 365A to define a first magnet retention pocket for locating magnet section 308A. Similar axially aligned pairs of hub pockets 331B-331D with corresponding retainer pockets 365B-365D define corresponding second, third and fourth magnet retention pockets for the other three magnet sections 308B-308D. The retention pockets are formed as through openings or open windows, thereby allowing the outer surface 400 and inner surface 402 of each magnet 308 to remain openly exposed when retained in the retention pockets.

Upon pre-assembly of the aforementioned components, a bonding operation is used to bond hub 302 and retainer 304 in coaxial alignment with one another along the rotor axis RA, and in particular, the bonding operation bonds the mounting surfaces 337 on hub lugs 330 with the mounting surfaces 375 on retainer lugs 364. Preferably, a welding operation, such as a sonic welding process, is used thermally bond and rigidly interconnect and fix hub 302 to retainer 304 to define a bonded, two-piece plastic carrier assembly 314. Upon bonding the two-pieces 302, 304 together, the outer surfaces 400 of magnets 308 remain exposed, thereby maximizing their magnetic coupling with the corresponding stator unit. The inventive concept of the present disclosure provides a means for retaining the four arc-shaped, also referred to as arcuate, magnets 308 in the bonded plastic carrier assembly 314 so as to precisely position the separately contained magnets 308 radially against steel flux core 306 in contact therewith, with the magnets 308 further being precisely retained axially and angularly within carrier assembly 314, thereby maximizing the performance of the rotor unit 300.

Figure 20:
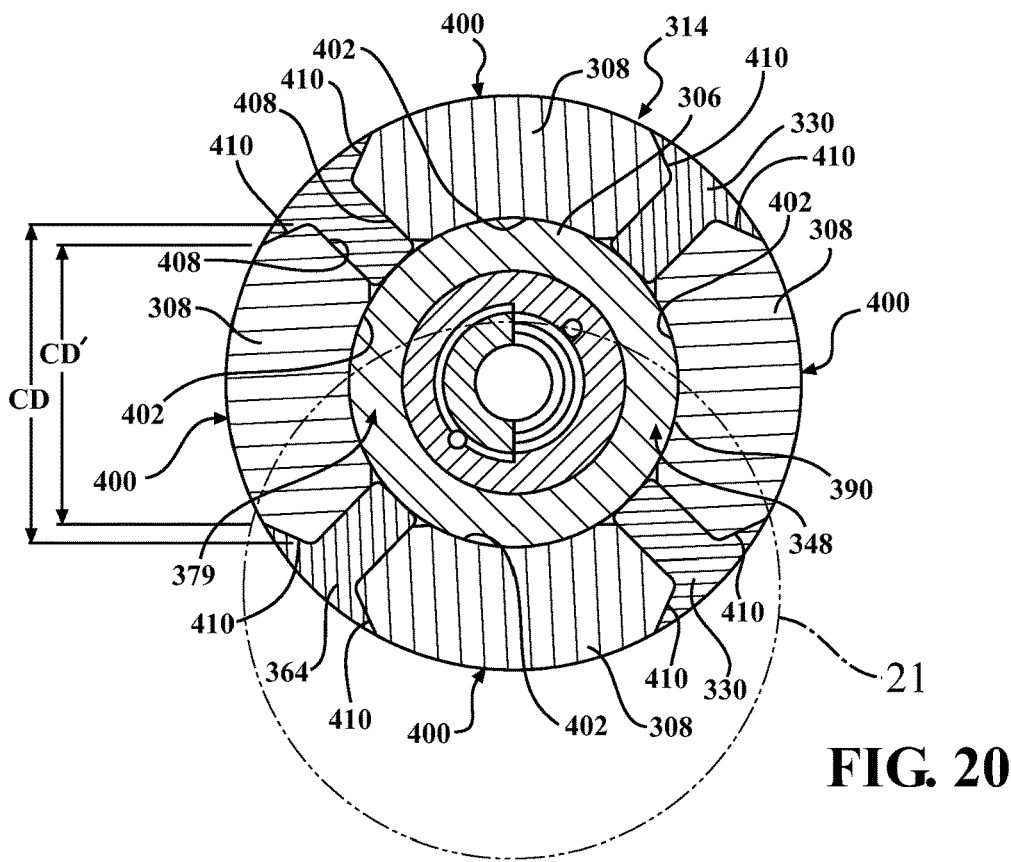
FIG. 20 is a sectional view of the rotor unit taken generally along line "20-20" of FIG. 16.
Figure 21:
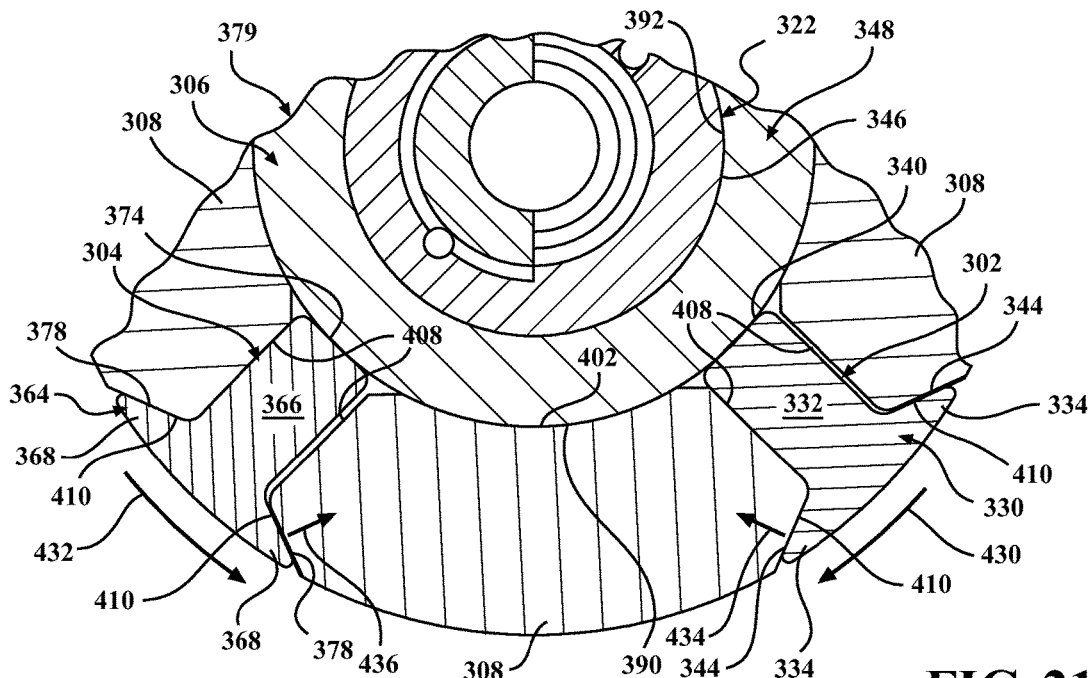
FIG. 21 is a partial enlarged view of the encircled area 21 of the rotor unit shown in FIG. 20.

As disclosed, the through openings forming the magnet retention pockets in carrier assembly 314, discussed in further detail below, are split in half or substantially in half by a plane P (FIG. 16) extending transverse and normal to the rotary axis RA of rotor unit 300. To this end, the axial length dimension of hub lugs 330 and retainer lugs 364 is provided to be one-half or about one-half the axial length dimension of magnets 308, and thus, one-half or about one-half the axial length dimension flux core 306. As such, as shown, by way of example and without limitation, the bond joints formed between the hub lugs 330 and retainer lugs 364 are substantially coplanar. The hub 302 and retainer 304 are bonded together after insertion of magnets 308 into their respective magnet retention pockets and after insertion of the flux core 306 into the hub channel 348 and retainer channel 379. During bonding, such as via presently preferred sonic welding, as best shown in FIG. 21, hub 302 and retainer 304 are rotated relative to one another in opposite directions 430, 432 about the axially extending rotor axis RA such that the respective radially inwardly facing inner cam surfaces 344, 378 on lugs 330, 364 engage the complimentary radially outwardly facing outer cam surfaces 410 of magnets 308, thereby forcing magnets 308 to move radially inwardly under the bias imparted by the camming interaction, and thus, bringing and forcing the inner surface 402 of each magnet 308 into engagement with outer surface 390 of flux core 306. To facilitate rotating the hub 302 and retainer 304 relative to one another during the bonding process, drive slots 420 (FIG. 18) can be formed in a second face surface 422 of plate segment 360 of retainer 304 to accept a tool used for rotating retainer 304 against hub 302 and magnets 308. Arrow 430 in FIG. 21 indicates clockwise rotation of hub 302 while arrow 432 indicates counter-clockwise rotation of retainer 304 during the preferred sonic welding process. Welding ribs 380 are configured to melt or at least partially melt during the sonic welding process and provide initially melted material for thermally bonding hub lugs 330 to retainer lugs 364. Likewise, crush ribs 382 are configured to at least partially deform or melt during the sonic welding process to take up axial slack tolerances associated with the axial length of the magnets 308. The camming action provided between the respective hub and retainer lug inner cam surfaces 344, 378 and the magnet outer cam surfaces 410 is illustrated by arrows 434 and 436 and which indicate how magnets 308 are driven radially inwardly during the camming and bonding process, and axially and angularly located and retained within carrier assembly 314. It should be recognized that the magnets 308 are locked in position upon bonding the two parts, hub 302 and retainer 304, to one another via the plurality of circumferentially spaced bond joints formed between the hub lug segments 330 and retainer lug segments 364, with the magnets 308 being restrained against radially outward movement by the overlying cam surfaces 344, 378. Accordingly, the circumferential dimension CD of the magnets 308 is greater than the circumferential dimension CD' extending between the radially outermost opposed edges of the cam surfaces of the lugs (FIG. 20). Bushings 310 and 312 are installed in central aperture 350 in hub 302 following completion of the welding process. Anti-rotation boss slots 438 and complimentary bushing lugs 440 couple sleeve bushing 310, 312 for common, conjoint rotation with carrier assembly 314.

Those skilled in the art will appreciate that various revisions and alternative arrangements can be made to the components of rotor unit 300 that are within the scope of the present disclosure. For example, the number of lugs, magnets, magnet pockets, etc. can be different than the plurality of four disclosed and shown, so long as the number thereof facilitates retention of the arc-shaped magnets therein. Likewise, the number, location and dimensions for weld ribs 380 on retainer lugs 364 can be varied, as well as the number location and dimensions of crush ribs 382. In fact, it may be possible to locate such ribs 380, 382 on retainer plate 304 or, in the alternative, in combination with similar ribs on hub 302 or, in a further alternative, completely eliminate such ribs if not required by the ultrasonic welding process to establish a rigidly bonded weld interface between the hub and retainer lugs.

Referring now to FIGS. 24 through 28, an alternative construction for a rotor unit 300A is illustrated. As seen, several components such as magnets 308, flux core 306 and sleeve bushings 310, 312 are not shown but are understood to be associated with rotor unit 300A similarly to their association with rotor unit 300. In view of the commonality of many components associated with rotor units 300A and 300, common reference numerals are again used to identify such similar components. In general, rotor unit 300A only differs from rotor unit 300 in that an impeller 440 is shown to be fixed to, or formed integrally with, second boss segment 326 of hub 302. In addition, crush ribs 382 have been eliminated from retainer 304 and weld ribs 380A are now shown associated with retainer lugs 364 on retainer 304.

Referring now to FIGS. 29 through 33, another alternative construction for a rotor unit 300B is illustrated which embodies the teachings of the present disclosure. Again, common reference numerals are used to identify these components of rotor unit 300B that are similar in construction and/or function to those components of rotor units 300 and 300A. In this particular embodiment, first boss segment 322B of hub 302 has been axially extended to pass through central aperture 362 in retainer 304 to permit impeller 440 to be secured thereto. In addition, an elongated bushing rod 442 is press-fit into central aperture 350 of elongated boss segment 322B of hub 302. Bushing rod 442 has a central aperture 444 through which shaft 38, 138 extends. Preferably, bushing rod 442 is fabricated from a carbon-filled material and functions to eliminate bushings 310, 312. As seen, weld ribs 380 are now shown associated with hub lugs 330 on hub 302.

In accordance with the present disclosure, the components of carrier assembly 314 are made from a plastic material capable of being thermally bonded. One preferred, but non-limiting, material for hub 302 and retainer plate 304 is PPS Poly (p-phenylene sulfide). In addition, the number, location and size of weld ribs 380 and crush ribs 382 can be varied to provide the desired weld interface between hub lugs 330 and retainer lugs 364. Furthermore, while the present disclosure is directed to describing an axially-welded version of rotor units, it is contemplated that the two-piece plastic carrier assembly concept can likewise be adapted to a radially-welded version where the components will have radially overlapping lugs adapted for sonic welding.

Those skilled in the art will recognize that the non-overmolded magnet carrier embodiments described herein can be used with any other type of rotor unit used in electronically-driven motor assemblies and not limited only to electric water pumps. In addition, the inventors recognize and intend that the inventive concepts disclosed herein can be used in rotor units that are adapted to be fixed for rotation with a central rotor shaft. In such applications, the rotor shaft can be press-fit into bushing sleeves 310, 312 or bushing rod 442. Alternatively, rotor units could be configured without boss segments to permit direct connection of flux core 306 to the rotary shaft, an example of such an arrangement shown in U.S. Pat. No. 8,747,082, provide that the two-piece carrier assembly provides axial, radial and angular retention of the magnets relative to the flux core.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. An electric fluid pump, comprising:
a stator unit configured to generate a magnetic field in response to a control signal;
a rotor unit received within said stator unit, said rotor unit being configured to rotate about a central rotor axis in response to the magnetic field generated at said stator unit; and
a control apparatus for supplying the control signal to energize the stator unit;
wherein the rotor unit includes a plurality of magnets contained in a two-piece carrier assembly having first and second carrier members axially fixed to one another by a bond joint, wherein said first carrier member defines a plurality of hub pockets, wherein said second carrier member defines a plurality of retainer pockets in alignment with said hub pockets to define a plurality of magnet retention pockets each defined by one of said hub pockets and one of said retainer pockets, wherein said plurality of magnets are received in said magnet retention pockets, wherein said first and second carrier members have tapered surfaces, wherein said magnets have tapered surfaces, wherein said tapered surfaces of said first and second carrier members are engaged with said tapered surfaces of said magnets to bias said magnets radially inwardly wherein said first and second carrier members each have generally planar faces extending substantially transversely to said rotor axis and a plurality of circumferentially spaced lug segments extending outwardly from said faces, said lug segments on said first carrier member being bonded to said lug segments on said second carrier member, and wherein a plurality of said lug segments have at least partially melted ribs forming a bond joint being said bonded lug segments.

2. The electric fluid pump of claim 1 wherein said rotor unit includes a metal tubular member extending in coaxial relation about said central rotor axis, said magnets being biased by said tapered surfaces into engagement with an outer surface of said metal tubular member.

3. The electric fluid pump of claim 2 wherein one of said first and second carrier members has a tubular boss segment, said metal tubular member being disposed over said tubular boss segment.

4. The electric fluid pump of claim 3 wherein said first and second carrier members each have generally planar faces extending substantially transversely to said rotor axis and a plurality of circumferentially spaced lug segments extending outwardly from said faces, said lug segments on said first carrier member being bonded to said lug segments on said second carrier member.

5. The electric fluid pump of claim 4 wherein said magnets are contained between said lug segments.

6. The electric fluid pump of claim 1 wherein said magnets are contained between said lug segments.

7. The electric fluid pump of claim 6 wherein said magnets having opposite sidewalls engaged with said planar faces.

8. The electric fluid pump of claim 7 wherein said planar faces have at least partially deformed ribs engaging said magnets.

9. The electric fluid pump of claim 1 wherein said lug segments are generally T-shaped, each lug segment having a radially extending leg portion and a pair of circumferentially extending arm portions.

10. The electric fluid pump of claim 9 wherein said arm portions have said tapered surfaces engaged with said magnets to bias said magnets radially inwardly.

11. The electric fluid pump of claim 10 wherein each of said magnets having a pair of said tapered surfaces engaged with said surfaces of said arm portions.

12. An electric fluid pump, comprising:
a pump housing;
a stator unit disposed in said pump housing and configured to generate a magnetic field in response to a control signal;
a rotor unit also being disposed in said pump housing and received within said stator unit, said rotor unit being configured to rotate about a central rotor axis in response to the magnetic field generated at said stator unit, wherein said rotor unit includes a plurality of magnets being axially and circumferentially retained in a carrier assembly for conjoint rotation therewith about said rotor axis, and wherein said carrier assembly includes a first carrier member and second carrier member each including a plate for biasing said plurality of magnets in opposing axial directions, wherein said first carrier member includes a plurality of lug segments positioned in circumferentially spaced relationship with one another and defining a plurality of hub pockets circumferentially therebetween, wherein said second carrier member includes a plurality of lug segments positioned in circumferentially spaced relationship with one another and in alignment with said lug segments of said first carrier member and defining a plurality of retainer pockets circumferentially therebetween and in alignment with said hub pockets, wherein said plurality of magnets are received in said hub and retainer pockets such that said plurality of magnets are positioned circumferentially between said lug segments of said first and second carrier members, and wherein at least one partially deformed crush rib is disposed on at least one of said carrier member plates and axially biasing a corresponding one of said plurality of magnets; and
said lug segments of said first and second carrier members axially fixed to one another by a bond joint.

13. The electric fluid pump of claim 12 wherein said first and second carrier members have tapered surfaces, wherein said magnets have tapered surfaces, and wherein said tapered surfaces of said first and second carrier members are engaged with said tapered surfaces of said magnets to bias said magnets radially inwardly.

14. The electric fluid pump of claim 13 wherein said lugs are generally T-shaped, each lug having a radially extending leg portion and a pair of circumferentially extending arm portions.

15. The electric fluid pump of claim 14 wherein said arm portions of said circumferentially adjacent lugs are circumferentially spaced to define openings therebetween exposing said magnets to said pump housing.

16. The electric fluid pump of claim 13 wherein said lugs each define a mounting surface including at least one partially melted welding rib sonically-welded to said second carrier member.

17. The electric fluid pump of claim 12 wherein a radial outer surface of each of said magnets is substantially radially aligned with a radial outer surface of each of said lug segments.

18. An electric fluid pump, comprising:
a stator unit configured to generate a magnetic field in response to a control signal;

a rotor unit received within said stator unit, said rotor unit being configured to rotate about a central rotor axis in response to the magnetic field generated at said stator unit; and a control apparatus for supplying the control signal to energize the stator unit;

wherein the rotor unit includes a plurality of magnets contained in a two-piece carrier assembly having first and second carrier members axially fixed to one another by a bond joint, wherein said first carrier member defines a plurality of hub pockets, wherein said second carrier member defines a plurality of retainer pockets in alignment with said hub pockets to define a plurality of magnet retention pockets each defined by one of said hub pockets and one of said retainer pockets, wherein said plurality of magnets are received in said magnet retention pockets, wherein said first and second carrier members have tapered surfaces, wherein said magnets have tapered surfaces, wherein said tapered surfaces of said first and second carrier members are engaged with said tapered surfaces of said magnets to bias said magnets radially inwardly, wherein said first and second carrier members each have generally planar faces extending substantially transversely to said rotor axis and a plurality of circumferentially spaced lug segments extending outwardly from said faces, said lug segments on said first carrier member being bonded to said lug segments on said second carrier member, wherein said magnets are contained between said lug segments, wherein said magnets having opposite sidewalls engaged with said planar faces, and wherein said planar faces have at least partially deformed ribs engaging said magnets.

* * * * *